(12) United States Patent
Buhr et al.

(10) Patent No.: US 10,186,002 B2
(45) Date of Patent: *Jan. 22, 2019

(54) APPARATUS AND METHOD FOR MATCHING USERS TO GROUPS FOR ONLINE COMMUNITIES AND COMPUTER SIMULATIONS

(75) Inventors: Brian Douglas Buhr, San Diego, CA (US); Sreelata Santhosh, Carlsbad, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/426,446

(22) Filed: Mar. 21, 2012

(65) Prior Publication Data

US 2013/0254278 A1    Sep. 26, 2013

(51) Int. Cl.
*A63F 13/795* (2014.01)
*G06Q 50/00* (2012.01)
(Continued)

(52) U.S. Cl.
CPC ........... *G06Q 50/01* (2013.01); *A63F 13/795* (2014.09); *G06Q 10/0639* (2013.01); *G06F 3/0482* (2013.01)

(58) Field of Classification Search
CPC ........... G06F 3/00–3/05; G06F 3/0481; G06Q 10/10; H04N 7/15; H04L 12/1813;
(Continued)

(56) References Cited

U.S. PATENT DOCUMENTS 6,052,723 A    4/2000    Ginn
7,023,979 B1   4/2006    Wu et al.
(Continued)

FOREIGN PATENT DOCUMENTS

CN    1471774       1/2004
CN    1795691 A     6/2006
(Continued)

OTHER PUBLICATIONS

"Seek Team: The online recruitment board for gamers," as published in Feb. 2012 at seek-team.com, retrieved from the Internet Archive, 6 pages.*
(Continued)

*Primary Examiner* — Dino Kujundzic
(74) *Attorney, Agent, or Firm* — Fitch, Even, Tabin & Flannery LLP

(57) ABSTRACT

A method includes detecting a first user seeking to join a group, detecting one or more groups recruiting members, retrieving user parameters corresponding to the first user, and retrieving group parameters corresponding to each of the one or more groups. The group parameters may comprise group characteristic data and group requirements. For each group of the one or more groups, the group parameters corresponding to the group are compared against the user parameters corresponding to the first user. A score is determined for each of the one or more groups based on the comparing. One or more selected groups of the one or more groups is recommended to the first user at least in part based on the score. One or more computer programs may be adapted to execute the above steps, and a processor may be configured to perform the above steps.

15 Claims, 16 Drawing Sheets

(51) Int. Cl.
*G06Q 10/06* (2012.01)
*G06F 3/0482* (2013.01)

(58) Field of Classification Search
CPC . H04L 12/581; H04L 29/06; H04L 29/08576; H04L 29/08072; H04L 29/0809; H04L 29/06095; A63F 13/12
USPC .......................... 715/751, 753, 758; 709/204
See application file for complete search history.

(56) References Cited

U.S. PATENT DOCUMENTS

| | | | |
|---|---|---|---|
| 7,162,433 | B1 | 1/2007 | Foroutan |
| 7,300,353 | B2 * | 11/2007 | Goto ........................ A63F 13/12 463/1 |
| 7,529,797 | B2 | 5/2009 | Tseng |
| 7,585,217 | B2 | 9/2009 | Lutnick et al. |
| 7,614,955 | B2 | 11/2009 | Farnham et al. |
| 7,634,115 | B2 | 12/2009 | Ryu |
| 7,676,034 | B1 | 3/2010 | Wu et al. |
| 7,693,827 | B2 | 4/2010 | Zamir |
| 7,716,140 | B1 | 5/2010 | Nielsen |
| 7,756,926 | B2 | 7/2010 | Tseng |
| 7,818,394 | B1 | 10/2010 | Lawler et al. |
| 7,831,684 | B1 | 11/2010 | Lawler et al. |
| 7,877,082 | B2 | 1/2011 | Eagle |
| 7,908,647 | B1 | 3/2011 | Polis |
| 7,937,348 | B2 | 5/2011 | Shaw et al. |
| 7,979,366 | B2 | 7/2011 | Sundararajan |
| 7,997,973 | B2 | 8/2011 | Lutnick et al. |
| 8,010,460 | B2 | 8/2011 | Work et al. |
| 8,015,019 | B1 | 9/2011 | Smith |
| 8,019,641 | B2 | 9/2011 | Foroutan |
| 8,055,720 | B2 | 11/2011 | He |
| 8,060,463 | B1 | 11/2011 | Spiegel |
| 8,095,432 | B1 | 1/2012 | Berman |
| 8,122,091 | B2 | 2/2012 | O'Sullivan et al. |
| 8,271,357 | B2 | 9/2012 | Mohan |
| 8,388,450 | B1 * | 3/2013 | McGuirk .................. A63F 9/24 463/42 |
| 8,413,060 | B1 * | 4/2013 | Agrawal ........................ 715/753 |
| 8,655,715 | B2 | 2/2014 | Foroutan |
| 8,761,575 | B2 | 6/2014 | Zbeda |
| 8,775,526 | B2 | 7/2014 | Lorch et al. |
| 8,799,787 | B2 | 8/2014 | Hamilton, II et al. |
| 8,819,565 | B2 | 8/2014 | Cragun et al. |
| 8,831,276 | B2 | 9/2014 | Martinez |
| 8,832,277 | B2 | 9/2014 | Clark et al. |
| 8,856,641 | B2 | 10/2014 | Pueyo |
| 8,893,025 | B2 | 11/2014 | Vance et al. |
| 8,910,060 | B2 | 12/2014 | Chandra |
| 8,949,278 | B2 | 2/2015 | Ulm |
| 9,002,752 | B2 | 4/2015 | Kalanithi |
| 9,177,294 | B2 | 11/2015 | Chijiiwa |
| 9,195,966 | B2 | 11/2015 | Vance |
| 9,210,247 | B2 | 12/2015 | Vance |
| 9,224,172 | B2 | 12/2015 | Churchill |
| 9,246,613 | B2 | 1/2016 | McKee |
| 2002/0063735 | A1 | 5/2002 | Tamir et al. |
| 2002/0078150 | A1 | 6/2002 | Thompson |
| 2003/0177187 | A1 | 9/2003 | Levine et al. |
| 2003/0227479 | A1 | 12/2003 | Mizrahi et al. |
| 2004/0030787 | A1 * | 2/2004 | Jandel et al. ................. 709/229 |
| 2004/0127289 | A1 | 7/2004 | Davis et al. |
| 2005/0188318 | A1 | 8/2005 | Tamir et al. |
| 2005/0192097 | A1 | 9/2005 | Farnham et al. |
| 2006/0046819 | A1 | 3/2006 | Nguyen et al. |
| 2006/0123117 | A1 * | 6/2006 | Heutchy et al. ............. 709/227 |
| 2006/0178216 | A1 | 8/2006 | Shea |
| 2006/0205503 | A1 | 9/2006 | Miura |
| 2006/0229902 | A1 * | 10/2006 | McGovern ............. G06Q 10/06 705/321 |
| 2006/0242291 | A1 | 10/2006 | Nevalainen |
| 2006/0247055 | A1 | 11/2006 | O'Kelley, II et al. |
| 2006/0287096 | A1 | 12/2006 | O'Kelley, II et al. |
| 2006/0287099 | A1 | 12/2006 | Shaw et al. |
| 2007/0016599 | A1 | 1/2007 | Plastina |
| 2007/0026934 | A1 | 2/2007 | Herbrich |
| 2007/0033214 | A1 | 2/2007 | Lewis et al. |
| 2007/0050192 | A1 | 3/2007 | Gutta |
| 2007/0072678 | A1 | 3/2007 | Dagres |
| 2007/0117635 | A1 * | 5/2007 | Spanton .................. A63F 13/12 463/43 |
| 2007/0173324 | A1 | 7/2007 | Multerer et al. |
| 2007/0190494 | A1 | 8/2007 | Rosenberg |
| 2007/0233736 | A1 | 10/2007 | Xiong |
| 2007/0297584 | A1 | 12/2007 | Lalwani |
| 2008/0026827 | A1 | 1/2008 | Skotarczak et al. |
| 2008/0051193 | A1 | 2/2008 | Kaminkow et al. |
| 2008/0059897 | A1 | 3/2008 | Dilorenzo |
| 2008/0070667 | A1 | 3/2008 | Lutnick et al. |
| 2008/0085769 | A1 | 4/2008 | Lutnick et al. |
| 2008/0103784 | A1 | 5/2008 | Wong |
| 2008/0114737 | A1 | 5/2008 | Neely et al. |
| 2008/0133437 | A1 | 6/2008 | Shaw et al. |
| 2008/0140650 | A1 | 6/2008 | Stackpole |
| 2008/0161101 | A1 | 7/2008 | Lutnick et al. |
| 2008/0189122 | A1 | 8/2008 | Coletrane |
| 2008/0191418 | A1 | 8/2008 | Lutnick et al. |
| 2008/0195464 | A1 | 8/2008 | Brooks |
| 2008/0215547 | A1 | 9/2008 | Matsumoto |
| 2008/0215581 | A1 | 9/2008 | Messing |
| 2008/0220877 | A1 * | 9/2008 | Guthrie ........................ 463/42 |
| 2008/0228776 | A1 | 9/2008 | Weiss et al. |
| 2008/0235339 | A1 | 9/2008 | Lurey |
| 2008/0243933 | A1 | 10/2008 | Holtzman |
| 2008/0248849 | A1 | 10/2008 | Lutnick et al. |
| 2008/0254881 | A1 | 10/2008 | Lutnick et al. |
| 2008/0256015 | A1 | 10/2008 | Woolf |
| 2008/0263460 | A1 | 10/2008 | Altberg et al. |
| 2008/0275719 | A1 | 11/2008 | Davis |
| 2008/0275813 | A1 | 11/2008 | Altberg |
| 2009/0030932 | A1 | 1/2009 | Harik |
| 2009/0049405 | A1 | 2/2009 | Lockhart |
| 2009/0055263 | A1 | 2/2009 | Okubo |
| 2009/0061974 | A1 | 3/2009 | Lutnick et al. |
| 2009/0063284 | A1 | 3/2009 | Turpin |
| 2009/0097622 | A1 | 4/2009 | Sangberg |
| 2009/0099924 | A1 | 4/2009 | Lensch |
| 2009/0112701 | A1 | 4/2009 | Turpin |
| 2009/0124320 | A1 * | 5/2009 | DeWaal .............. G07F 17/3258 463/16 |
| 2009/0138820 | A1 | 5/2009 | Lockhart |
| 2009/0156312 | A1 * | 6/2009 | Ng et al. ........................ 463/42 |
| 2009/0163183 | A1 | 6/2009 | Odonoghue |
| 2009/0186330 | A1 | 7/2009 | Brownholtz |
| 2009/0187865 | A1 | 7/2009 | Brownholtz |
| 2009/0191962 | A1 | 7/2009 | Hardy |
| 2009/0227374 | A1 | 9/2009 | Tirpak et al. |
| 2009/0240659 | A1 | 9/2009 | Ganz |
| 2009/0259621 | A1 | 10/2009 | Svendsen |
| 2009/0265428 | A1 | 10/2009 | Light |
| 2009/0276459 | A1 | 11/2009 | Trout |
| 2009/0307168 | A1 | 12/2009 | Bockius |
| 2009/0313285 | A1 | 12/2009 | Hronopoulos |
| 2010/0017371 | A1 | 1/2010 | Whalin et al. |
| 2010/0070448 | A1 | 3/2010 | Omoigui |
| 2010/0070860 | A1 | 3/2010 | Alkov et al. |
| 2010/0082403 | A1 | 4/2010 | Higgins |
| 2010/0082618 | A1 | 4/2010 | Ott, IV et al. |
| 2010/0088372 | A1 | 4/2010 | Shridhar |
| 2010/0105440 | A1 | 4/2010 | Kruzeniski |
| 2010/0107089 | A1 | 4/2010 | Light et al. |
| 2010/0131489 | A1 | 5/2010 | Goldman-Shenhar |
| 2010/0137067 | A1 | 6/2010 | Kobayashi |
| 2010/0144438 | A1 | 6/2010 | Miura |
| 2010/0145771 | A1 | 6/2010 | Fligler |
| 2010/0153453 | A1 | 6/2010 | Knowles |
| 2010/0179756 | A1 | 7/2010 | Higgins |
| 2010/0179856 | A1 | 7/2010 | Paretti |
| 2010/0179874 | A1 | 7/2010 | Higgins |
| 2010/0205179 | A1 | 8/2010 | Carson |
| 2010/0205541 | A1 | 8/2010 | Rapaport et al. |
| 2010/0228582 | A1 | 9/2010 | King |

(56) References Cited

U.S. PATENT DOCUMENTS

| | | | |
|---|---|---|---|
| 2010/0229082 A1* | 9/2010 | Karmarkar et al. | 715/205 |
| 2010/0235443 A1 | 9/2010 | Laiho | |
| 2010/0262570 A1 | 10/2010 | Tateno | |
| 2010/0293247 A1 | 11/2010 | Mckee | |
| 2010/0306672 A1* | 12/2010 | McEniry | 715/753 |
| 2010/0332404 A1* | 12/2010 | Valin | 705/310 |
| 2011/0010384 A1 | 1/2011 | Luo | |
| 2011/0022621 A1 | 1/2011 | Luo | |
| 2011/0029873 A1 | 2/2011 | Eseanu et al. | |
| 2011/0055725 A1 | 3/2011 | Folgner et al. | |
| 2011/0055732 A1 | 3/2011 | Dawson et al. | |
| 2011/0055734 A1 | 3/2011 | Borst et al. | |
| 2011/0107239 A1 | 5/2011 | Adoni et al. | |
| 2011/0134204 A1 | 6/2011 | Rodriguez et al. | |
| 2011/0151892 A1 | 6/2011 | Vengroff | |
| 2011/0214072 A1 | 9/2011 | Lindemann et al. | |
| 2011/0219318 A1 | 9/2011 | Abhyanker | |
| 2011/0239137 A1 | 9/2011 | Bill | |
| 2011/0256937 A1 | 10/2011 | Van Luchene | |
| 2011/0263310 A1 | 10/2011 | Lutnick et al. | |
| 2011/0281627 A1 | 11/2011 | Lutnick et al. | |
| 2011/0294580 A1 | 12/2011 | Nakamura | |
| 2011/0296319 A1 | 12/2011 | Dinan et al. | |
| 2011/0302509 A1 | 12/2011 | Leacock et al. | |
| 2011/0320965 A1 | 12/2011 | Hairman | |
| 2011/0320966 A1 | 12/2011 | Edecker et al. | |
| 2012/0015741 A1* | 1/2012 | Craine | A63F 13/12 463/42 |
| 2012/0030193 A1 | 2/2012 | Richberg | |
| 2012/0034981 A1 | 2/2012 | Yamaguchi | |
| 2012/0036127 A1 | 2/2012 | Work et al. | |
| 2012/0042041 A1 | 2/2012 | Nakagami | |
| 2012/0046093 A1 | 2/2012 | Yamaguchi | |
| 2012/0046105 A1 | 2/2012 | Yamaguchi | |
| 2012/0071236 A1 | 3/2012 | Ocko | |
| 2012/0094757 A1* | 4/2012 | Vago et al. | 463/31 |
| 2012/0142429 A1* | 6/2012 | Muller | A63F 13/12 463/42 |
| 2012/0179672 A1 | 7/2012 | Van Wie et al. | |
| 2012/0227065 A1 | 9/2012 | Gilley et al. | |
| 2012/0296973 A1 | 11/2012 | Spivak | |
| 2012/0297038 A1 | 11/2012 | Mei et al. | |
| 2012/0311462 A1* | 12/2012 | Devecka | 715/753 |
| 2012/0323348 A1* | 12/2012 | Joo | A63F 13/12 700/92 |
| 2013/0017872 A1 | 1/2013 | Parks | |
| 2013/0249928 A1 | 9/2013 | Buhr et al. | |
| 2013/0254680 A1 | 9/2013 | Buhr et al. | |
| 2014/0067967 A1* | 3/2014 | Jackson | G06Q 50/01 709/206 |

FOREIGN PATENT DOCUMENTS

| | | |
|---|---|---|
| CN | 101160158 | 4/2008 |
| CN | 101180621 A | 5/2008 |
| CN | 101238494 A | 8/2008 |
| CN | 101443826 | 5/2009 |
| CN | 101460983 | 6/2009 |
| CN | 101556622 | 10/2009 |
| CN | 101732858 | 6/2010 |
| EP | 1570887 | 9/2005 |
| JP | 2002245212 | 8/2002 |
| JP | 2006-149425 A | 6/2006 |
| JP | 2007-082819 A | 4/2007 |
| JP | 2007213401 | 8/2007 |
| JP | 2008-245987 A | 10/2008 |
| JP | 2008-538318 A | 10/2008 |
| JP | 2008242521 | 10/2008 |
| JP | 2008-546469 A | 12/2008 |
| JP | 2011209982 | 10/2011 |
| JP | 2012003750 | 1/2012 |
| TW | 200622685 A | 7/2006 |
| WO | 2006/113809 A2 | 10/2006 |
| WO | 2007/001628 A2 | 1/2007 |
| WO | 2007/087078 A2 | 8/2007 |
| WO | 2010/141259 A1 | 12/2010 |
| WO | 2013/142059 A1 | 9/2013 |
| WO | 2013/142077 A2 | 9/2013 |
| WO | 2013/142081 A1 | 9/2013 |

OTHER PUBLICATIONS

"Gamer's recruitment website: Seek-Team.com," League of Legends Community Forums, Sep. 25, 2010, retrieved from http://forums.na.leagueoflegends.com/board/showthread.php?t=264110, pp. 1-2.*

U.S. Appl. No. 13/426,380, filed Mar. 21, 2012, Buhr et al.

U.S. Appl. No. 13/426,475, filed Mar. 21, 2012, Buhr et al.

USPTO; Office Action issued in U.S. Appl. No. 13/426,475, mailed Oct. 10, 2013, 20 pages.

Patent Cooperation Treaty; "Notification of Transmittal of the International Search Report and the Written Opinion of the International Searching Authority, or the Declaration" issued in corresponding foreign application No. PCT/US13/29546, mailed May 13, 2013, 1 page.

Patent Cooperation Treaty; "International Search Report" issued in corresponding foreign application No. PCT/US13/29546, mailed May 13, 2013, 3 pages.

Patent Cooperation Treaty; "Written Opinion of the International Searching Authority" issued in corresponding foreign application No. PCT/US13/29546, mailed May 13, 2013, 4 pages.

Patent Cooperation Treaty; "Notification of Transmittal of the International Search Report and the Written Opinion of the International Searching Authority, or the Declaration" issued in foreign application No. PCT/US13/29602, mailed May 20, 2013, 1 page.

Patent Cooperation Treaty; "International Search Report" issued in foreign application No. PCT/US13/29602, mailed May 20, 2013, 3 pages.

Patent Cooperation Treaty; "Written Opinion of the International Searching Authority" issued in foreign application No. PCT/US13/29602, mailed May 20, 2013, 6 pages.

Patent Cooperation Treaty; "Notification of Transmittal of the International Search Report and the Written Opinion of the International Searching Authority, or the Declaration" issued in foreign application No. PCT/US13/29341, mailed May 23, 2013, 1 page.

Patent Cooperation Treaty; "International Search Report" issued in foreign application No. PCT/US13/29341, mailed May 23, 2013, 3 pages.

Patent Cooperation Treaty; "Written Opinion of the International Searching Authority" issued in foreign application No. PCT/US13/29341, mailed May 23, 2013, 4 pages.

USPTO; Office Action issued in U.S. Appl. No. 12/557,376, mailed Dec. 21, 2011, 25 pages.

USPTO; Final Office Action issued in U.S. Appl. No. 12/557,376, mailed Jul. 18, 2012, 27 pages.

USPTO; Applicant-Initiated Interview Summary issued in U.S. Appl. No. 12/557,376, mailed Oct. 4, 2012, 3 pages.

USPTO; Applicant-Initiated Interview Summary issued in U.S. Appl. No. 12/557,376, mailed Oct. 23, 2012, 3 pages.

USPTO; Advisory Action issued in U.S. Appl. No. 12/557,376, mailed Nov. 21, 2012, 3 pages.

Patent Cooperation Treaty; "Notification of Transmittal of the International Search Report and the Written Opinion of the International Searching Authority or the Declaration" issued in PCT/US10/35972; mailed Jul. 14, 2010; 2 pages.

Patent Cooperation Treaty; "International Search Report" issued in PCT/US10/35972; mailed Jul. 14, 2010; 2 pages.

Patent Cooperation Treaty; "Written Opinion of the International Searching Authority" issued in PCT/US10/35972; mailed Jul. 14, 2010; 7 pages.

Taiwanese Patent Office; "Office Action of the Intellectual Property Office" issued in Taiwanese Patent Application No. 099117469, issued Jun. 26, 2013, 14 pages (includes English translation).

Chinese Patent Office; "First Office Action" (includes "Search Report") issued in Chinese Patent Application No. 201080024009.6, issued Jul. 3, 2013, 41 pages (includes English translation).

(56) References Cited

OTHER PUBLICATIONS

Japanese Patent Office; Notification of Reasons for Refusal issued in Japanese Patent Application No. 2012-513160, dated Sep. 10, 2013, 11 pages (includes English translation).
USPTO; Office Action issued in U.S. Appl. No. 13/426,380, mailed Oct. 23, 2013, 32 pages.
USPTO; Office Action issued in U.S. Appl. No. 13/426,475, mailed Apr. 22, 2014, 20 pages.
USPTO; Final Office Action issued in U.S. Appl. No. 13/426,380, mailed Apr. 23, 2014, 25 pages.
USPTO; Office Action issued in U.S. Appl. No. 12/557,376, mailed Jun. 11, 2014, 28 pages.
USPTO; Advisory Action issued in U.S. Appl. No. 13/426,380, mailed Jul. 10, 2014, 3 pages.
Chinese Patent Office; "Second Office Action" issued in Chinese Patent Application No. 201080024009.6, issued Mar. 12, 2014, 38 pages (includes English translation).
Japanese Patent Office; Decision to Grant a Patent issued in Japanese Patent Application No. 2012-513160, dated May 7, 2014, 3 pages.
USPTO; Office Action issued in U.S. Appl. No. 13/426,380, mailed Oct. 17, 2014, 21 pages.
USPTO; Office Action issued in U.S. Appl. No. 13/426,475, mailed Oct. 31, 2014, 9 pages.
USPTO; Final Office Action issued in U.S. Appl. No. 12/557,376, mailed Dec. 31, 2014, 27 pages.
Chinese Patent Office; "Third Office Action" issued in Chinese Patent Application No. 201080024009.6, issued Nov. 4, 2014, 50 pages (includes English translation).
USPTO; Applicant-Initiated Interview Summary issued in U.S. Appl. No. 13/426,380, mailed Jan. 22, 2015, 3 pages.
USPTO; Final Office Action issued in U.S. No. 13/426,380, mailed Feb. 25, 2015, 24 pages.
USPTO; Advisory Action & Examiner-Initiated Interview Summary issued in U.S. Appl. No. 12/557,376, mailed Apr. 6, 2015, 8 pages.
USPTO; Final Office Action issued in U.S. Appl. No. 13/426,475, mailed May 13, 2015, 12 pages.
Chinese Patent Office; "Fourth Office Action" issued in Chinese Patent Application No. 201080024009.6, issued May 21, 2015, 10 pages (includes English translation).
Chinese Patent Office; "Notification to Grant Patent Right for Invention" issued in Chinese Patent Application No. 201080024009.6, issued Sep. 17, 2015, 4 pages (includes English translation).
Japanese Patent Office; Notification of Reasons for Refusal issued in Japanese Patent Application No. 2015-501710, dated Sep. 29, 2015, 5 pages (includes English translation).
Korean Intellectual Property Office; "Notification of Preliminary Rejection" issued in corresponding Korean Patent Application No. 10-2014-7026616, mailed Sep. 21, 2015, 8 pages (includes English translation).
USPTO; Office Action issued in U.S. Appl. No. 13/426,380, mailed Aug. 20, 2015, 24 pages.
USPTO; Unpublished U.S. Appl. No. 61/485,443, filed May 12, 2011.
USPTO; Unpublished U.S. Appl. No. 61/548,499, filed Oct. 18, 2011.
USPTO; Unpublished U.S. Appl. No. 61/588,552, filed Jan. 19, 2012.
Japanese Patent Office; Decision to Grant a Patent issued in Japanese Patent Application No. 2015-501710, dated Jan. 5, 2016, 3 pages.
Japanese Patent Office; Notification of Reason(s) for Refusal issued in corresponding Japanese Patent Application No. 2015-501707, mailed Dec. 22, 2015, 8 pages (includes English translation).
Bing search q=match%20social%20network%20weight% Feb. 7, 2016.
Bing search q=match+social+network&src=IE-Search Feb. 7, 2016.
Brozovsky, Lukas, et al.; "Recommender System for Online Dating Service", arXiv.org, Cornell University Library, Mar. 9, 2007, pp. 1-12.
Chinese Patent Office; "First Office Action" issued in Chinese Patent Application No. 201380015632.9, issued Oct. 26, 2015, 17 pages (includes English translation).
European Patent Office; "Extended European Search Report" issued in European Patent Application No. 10783807.0, dated May 9, 2016, 8 pages.
Korean Intellectual Property Office; "Decision to Refuse a Patent" issued in corresponding Korean Patent Application No. 10-2014-7026616, mailed Mar. 10, 2016, 7 pages (includes English translation).
Korean Intellectual Property Office; "Notification of Preliminary Rejection" issued in Korean Patent Application No. 10-2014-7028159, mailed Feb. 1, 2016, 6 pages (includes English translation).
USPTO; Applicant-Initiated Interview Summary issued in U.S. Appl. No. 13/426,380, mailed Apr. 14, 2016, 3 pages.
USPTO; Final Office Action issued in U.S. Appl. No. 13/426,380, mailed Jan. 27, 2016, 38 pages.
USPTO; Office Action issued in U.S. Appl. No. 12/557,376, mailed Feb. 12, 2016, 36 pages.
USPTO; Office Action issued in U.S. Appl. No. 13/426,475, mailed May 4, 2016, 12 pages.
Japanese Patent Office; "Decision to Grant a Patent" issued in corresponding Japanese Patent Application No. 2015-501707, dated Jul. 5, 2016, 3 pages.
USPTO; Final Office Action issued in U.S. Appl. No. 12/557,376, mailed Aug. 24, 2016, 28 pages.
USPTO; Office Action issued in U.S. Appl. No. 13/426,380, mailed Jul. 15, 2016, 22 pages.
Chinese Patent Office; "First Office Action" issued in Chinese Patent Application No. 201380015001.7, issued Aug. 26, 2016, 32 pages (includes English translation).
USPTO; Advisory Action issued in U.S. Appl. No. 13/426,475, mailed Jan. 4, 2017, 3 pages.
USPTO; Final Office Action issued in U.S. Appl. No. 13/426,380, mailed Jan. 23, 2017, 22 pages.
USPTO; Final Office Action issued in U.S. Appl. No. 13/426,475, mailed Oct. 27, 2016, 11 pages.
USPTO; Office Action issued in U.S. Appl. No. 12/557,376, mailed Mar. 22, 2017, 30 pages.
Chinese Patent Office; "Second Office Action" issued in Chinese Patent Application No. 201380015001.7, dated Apr. 5, 2017, 28 pages (includes English translation).
USPTO; Office Action issued in U.S. Appl. No. 13/426,380, dated Jun. 21, 2017, 24 pages.
Chinese Patent Office; "Third Office Action" issued in Chinese Patent Application No. 201380015001.7, dated Sep. 5, 2017, 25 pages (includes English translation).
USPTO; Final Office Action issued in U.S. Appl. No. 12/557,376, dated Sep. 20, 2017, 33 pages.
Chinese Patent Office; Rejection Decision issued in Chinese Patent Application No. 201380015001.7, dated Mar. 2, 2018, 28 pages (includes English translation).
Chinese Patent Office; "The First Office Action" issued in Chinese Patent Application No. 201380015656.4, dated Feb. 12, 2018, 22 pages (includes English translation).
USPTO; Notice of Allowance and Fees Due issued in U.S. Appl. No. 13/426,380, dated Jun. 4, 2018, 8 pages.
U.S. Appl. No. 13/426,380, filed Mar. 21, 2012, entitled "Apparatus and Method for Matching Groups to Users for Online Communities and Computer Simulations", published as US 2013/0254680 A1 on Sep. 26, 2013.
U.S. Appl. No. 13/426,475, filed Mar. 21, 2012, entitled "Apparatus and Method for Visual Representation of One or More Characteristics for Each of a Plurality of Items", published as US 2013/0249928 A1 on Sep. 26, 2013.
U.S. Appl. No. 12/557,376, filed Sep. 10, 2009, entitled "Method and Apparatus for Matching Users in Multi-User Computer Simulations", published as US 2010/0306672 A1 on Dec. 2, 2010.
Chinese Patent Office; "The Fourth Office Action" issued in Chinese Patent Application No. 201380015001.7, dated Aug. 21, 2018, 8 pages (includes English translation).

(56) References Cited

OTHER PUBLICATIONS

Chinese Patent Office; "The Second Office Action" issued in Chinese Patent Application No. 201380015656.4, dated Aug. 24, 2018, 18 pages (includes English translation).

* cited by examiner

CLAN "C"
- Language - ENGLISH, SPANISH (precondition)
- Style – HARDCORE/DEDICATED (precondition)
- Headset - NOT REQUIRED (prerequisite)
- Calendar - F Sa Su (prerequisite)
- Stats:
  (Player PreRequisites:)
  - 1.0 K/D ratio
  (Clan PreConditions:)
  - 1.21 K/D ratio avg
  - Games playing: "Game X"

FIG. 5

PLAYER "P"

- Language – CHINESE/MANDARIN
- Headset - YES
- Calendar - M W F
- Stats (server provided):
  1.2 K/D ratio
  6 games/weekday avg
  0 games/weekend avg
  35% headset connected
- Locale: California
- Games played last month:
  "Game X", "Game Y"

FIG. 6

| CLAN RECRUITING | Score | Kills | Assists | Deaths | Ping |
|---|---|---|---|---|---|
| [+GER]LONSDALE | 315 | 61 | 0 | 19 | 59 |
| AcidfighterZ | 221 | 43 | 0 | 25 | 78 |
| [D3]Reep | 210 | 42 | 0 | 11 | 72 |
| Hero787 | 195 | 35 | 0 | 22 | 102 |
| [GTC]zandyxx | 171 | 31 | 0 | 23 | 129 |
| enemyUK    CLAN VOTE: L1↑ ↓L2 | 170 | 34 | 0 | 1 | 65 |
| [.CoM]Det0x | 127 | 25 | 0 | 24 | 71 |
| Bertus74 | 126 | 24 | 0 | 28 | 41 |
| EXPO | 125 | 21 | 0 | 29 | 102 |
| KingRollo | 115 | 21 | 0 | 39 | 54 |
| [TdM]Cracoucass | 103 | 17 | 0 | 24 | 113 |
| Isidore | 79 | 15 | 0 | 46 | 51 |
| -GTC-Floh | 71 | 13 | 0 | 22 | 73 |
| Natolin | 65 | 9 | 0 | 36 | 58 |
| URIANUS | 47 | 7 | 0 | 20 | 136 |
| HENRIK40 | 25 | 5 | 0 | 4 | 69 |
| CisekPL | 15 | 3 | 0 | 25 | 94 |

Clan Recruitment Tool
Clan Name: Volcano

Clan Recruitment Reports

| | Votes | Headsets? (Y/N) | Total Points | Kills Per Hour | Player Hours | Geo Location |
|---|---|---|---|---|---|---|
| dirtyTrigger  93% | +3 * | Y | 12099 | 130 | 234 | San Diego, CA |
| LovesChoc  91% | +2 | Y | 12099 | 112 | 121 | Los Angeles, CA |
| BugKilla  77% | -4 * | N | 12099 | 56 | 35 | Detroit, MI |
| Cappucino  94% | +3 | Y | 12099 | 78 | 213 | Los Angeles, CA |
| Champ123  86% | 0 | N | 12099 | 94 | 123 | Dublin, OH |

* = Interested in Your Clan  (i) — 910

Edit All — 920

APPARATUS AND METHOD FOR MATCHING USERS TO GROUPS FOR ONLINE COMMUNITIES AND COMPUTER SIMULATIONS

CROSS-REFERENCE TO RELATED APPLICATIONS

This application is related to U.S. patent application Ser. No. 13/426,380, filed on the same date as this application, entitled "APPARATUS AND METHOD FOR MATCHING GROUPS TO USERS FOR ONLINE COMMUNITIES AND COMPUTER SIMULATIONS", and U.S. patent application Ser. No. 13/426,475, filed on the same date as this application, entitled "APPARATUS AND METHOD FOR VISUAL REPRESENTATION OF ONE OR MORE CHARACTERISTICS FOR EACH OF A PLURALITY OF ITEMS", the entire disclosures of which are both incorporated by reference herein in their entireties.

BACKGROUND OF THE INVENTION

1. Field of the Invention

The present invention relates generally to online communities and computer simulations, and more specifically to users joining groups that participate in multi-user computer simulations, online communities, and other multi-user online activities.

2. Discussion of the Related Art

An online community is a virtual community that exists online, such as on the Internet. Online communities are typically formed through online interaction and involve people with some common interest or focus interacting online via discussion boards, chat rooms, message boards, bulletin boards, Weblogs, virtual worlds, and other collaborative and information-sharing media. Online communities have also become a supplemental form of communication between people who know each other primarily in real life.

Computer games, such as video games, have become a popular source of entertainment. Computer games are a type of computer simulation and are typically implemented in computer game software applications and are often run on game consoles, entertainment systems, desktop, laptop, and notebook computers, portable devices, tablet and pad-like devices, etc. An online game is a type of computer game or simulation played over a computer network, typically the Internet.

A multi-user computer simulation, such as a multi-user computer game, allows more than one user to participate in the simulation. Such multi-user computer simulations are often conducted online so that users in geographically diverse locations can participate. For example, online multi-user computer games allow players (also referred to herein as users) who are physically remote from each other, often in different parts of the world, to participate in the same game. Many multi-user computer simulations involve different teams, clans, or other types of groups of users, interacting or competing against each other.

SUMMARY OF THE INVENTION

One embodiment provides a computer readable storage medium storing one or more computer readable programs adapted to cause a processor based system to execute steps comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups, comparing the group parameters corresponding to the group against the user parameters corresponding to the first user; determining a score for each of the one or more groups based on the comparing; and recommending one or more selected groups of the one or more groups to the first user at least in part based on the score.

Another embodiment provides an apparatus comprising: a processor configured to perform the steps comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups, comparing the group parameters corresponding to the group against the user parameters corresponding to the first user; determining a score for each of the one or more groups based on the comparing; and recommending one or more selected groups of the one or more groups to the first user at least in part based on the score.

Another embodiment provides a method comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups, comparing the group parameters corresponding to the group against the user parameters corresponding to the first user; determining a score for each of the one or more groups based on the comparing; and recommending one or more selected groups of the one or more groups to the first user at least in part based on the score.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of several embodiments of the present invention will be more apparent from the following more particular description thereof, presented in conjunction with the following drawings.

FIG. 5 illustrates a group profile having a set of parameters for an exemplary group, according to several embodiments of the present invention.

FIG. 6 illustrates one exemplary embodiment of a user profile having a set of parameters for an exemplary user, according to several embodiments of the present invention.

FIG. 8 illustrates an exemplary screenshot of a screen provided to the user enabling voting or tagging of potential members before, during, or after the game, according to several embodiments of the present invention.

FIG. 9 illustrates an exemplary report generated for a group recruiting members, according to several embodiments of the present invention.

Figure 1:
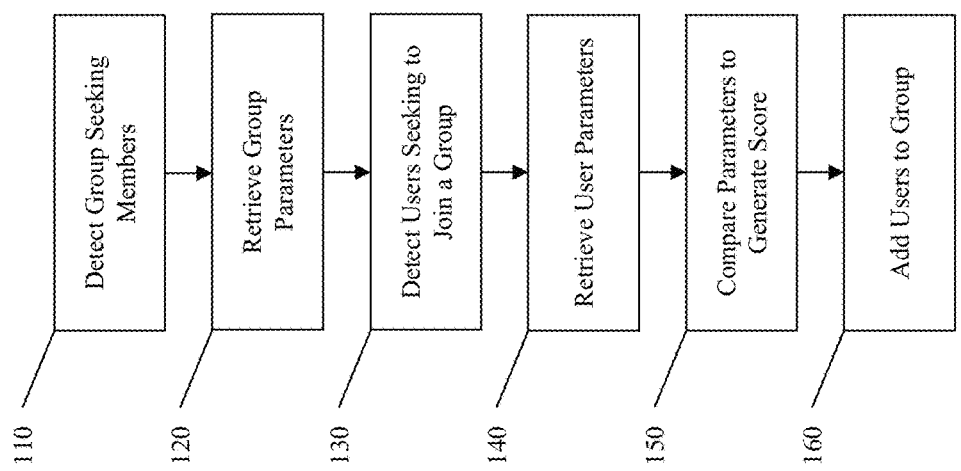
FIG. 1 illustrates an exemplary flow diagram of a process for recommending one or more potential members to a clan/group, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

As mentioned above, many multi-user computer simulations are often conducted online so that users in geographically diverse locations can participate. Many such users may be physically separated from each other by hundreds or even thousands of miles and may not know each other outside of their online community. As such, it can often be difficult for a user to choose or be matched with other users for purposes of joining or forming a team, clan, or other type of group of users that participate in multi-user computer simulations. Similarly, it can also be difficult for such groups to find users that would be a good match to become new members of the group.

Various computer environments and simulations provide various means for users to create and join groups and provide for interaction between members of these groups. These communities can provide for members to interact by posting content, such as a bulletin board system, or one where only a restricted number of people can initiate posts, such as Weblogs. Interaction may further be made possible by means such as text-based chat rooms and forums that use voice, video text or avatars.

In computer and video simulations, such as computer and video gaming, online communities may take the form of a team, clan or a guild comprising a group of users that play online games together. These members may play against other teams, clans or guilds (or other types of groups) via matches or challenges, also known as scrims (scrimmages) and wars. A clan's objective can vary from having fun in a competitive environment or participating in more serious tournaments and clan wars.

As most of these online communities and/or clans are created and conducted with minimal face to face interaction, it is difficult for an individual to identify groups, such as clans, teams or guilds, to which the user would like to belong to or other individuals with which the user would like to associate. Likewise, it is equally difficult for such a group, via its clan officers or members, to recruit individuals into existing communities or clans. Standard methods of criteria matching and filters do not work well for online gaming, dating, employment, or other types of communities and/or clans. For example, criteria matching can fail because predefined metrics or weights may not correctly reflect the desired importance of the seeker. Filters are similarly not ideal as they represent a binary method of matchmaking in that they only provide an on/off method of expressing preferences with no grey area in between. In addition, as the preferences and characteristics of user and communities are needed for matching the individuals to groups, issues arise with the accuracy and consistency of information which is further escalated by the online and/or virtual nature of these communities. For example, individuals, groups and/or clans can lie, whether intentionally or unintentionally, about facts such as their interests, behavior, and preferences/tendencies.

Embodiments of the present invention provide methods for matching users to groups and/or groups to users in online communities, multi-user computer simulations, such as multi-user computer games, and/or other multi-user online activities. For example, embodiments of the present invention provide a method for navigating online communities to successfully recruit and join with others. Embodiments of the present invention provide such matchmaking system for game-related clans and game matchmaking as well as other communities such as non-gaming online communities, social networking, personal matchmaking, and job recruitment.

In some embodiments, the present invention provides for a visual/manual or automatic recruitment tool that allows users to discover each other for the purpose of recruiting members into groups or clans or associating one's self with other individuals, groups or clans. In some embodiments, a clan recruitment system for the player community is provided that may be used for joining groups and recruiting users to create, maintain, and/or expand online computer user communities and simulations.

The present system and methods may be applied to any electronic-based community and input device, including but not limited to consoles, game consoles, entertainment systems, desktop and laptop computers, hand-held computing and phone devices, social networking and online applications. While throughout the specification references may be made to exemplary embodiments dealing with online and/or internet based communication with respect to gaming and clan based communities, it should be understood by a person of ordinary skill in the art that embodiments of the invention in general can be employed with respect to any electronic-based community and input device, including but not limited to those mentioned above.

In some embodiments, the methods and systems described herein cater to two broad cases: (1) clans (or other types of groups) advertising their open recruitment and seeking player(s) (or other types of members) to invite; and (2) players (or other types of users) advertising their availability and seeking clan(s) (or other types of groups) to join. These two cases are described below.

Referring first to FIG. 1, an example of the first case is described. Namely, an exemplary flow diagram of a process for recommending one or more potential members to a clan/group is illustrated according to some embodiments.

First in step 110, a first group seeking members is detected. For example, in some embodiments, a request is received from a group seeking to recruit one or more members. In some embodiments, the system enables groups or clans to advertise their open recruitment and seek one or more members to invite. In some embodiments, clans, for example may inform the system of having one or more openings and may further provide one or more criteria for the new members of the group or clan.

In step 120, upon determining that the group is seeking members, the system retrieves group parameters or profile information regarding the group. In some embodiments, group parameters comprise preconditions, i.e., basic descriptive items representing the overall characteristics of the group. Furthermore, in some embodiments, the group parameters may additionally or alternatively comprise prerequisites the group imposes on potential members. In some embodiments, the preconditions or prerequisites may be manually entered by one or more members of the group, system generated, or a combination thereof. For example, in some embodiments, the system may generate one or more of the preconditions and prerequisites regarding the group based on game play behavior of one or more members of the group.

In some embodiments, clans (or other groups) announce preferred player prerequisites and clan preconditions. These preconditions can be implemented via tags and represented via clouds, lists, or other means, which are discussed below. In some embodiments, the group parameters are published by the group when the recruiting system is generated. In some embodiments, the group parameters may be published when the group first subscribes to the system and/or when the group advertises recruitment. In some embodiments, the system may generate system based parameters and may supplement the published group parameters with the system generated parameters. In an additional or alternative embodiment, the group parameters may be updated at any time by the members of the group and/or by the system. In some embodiments, the group parameters may be stored within a group profile, as shown for example in FIG. 5.

Next, in step 130 (FIG. 1), the system detects one or more users seeking to join a group. That is, in some embodiments, the system may retrieve a list of one or more users seeking to join groups. For example, in some embodiments, one or more users may advertise their availability and seek to join clans or groups. In some embodiments, for example, users may join the system and provide their characteristics and criteria and may then indicate that they are looking for groups to join. In some embodiments, users may be queried based on their characteristics whether they are available to join groups.

In step 140, the system retrieves user parameters for each of the users detected in step 130. In some embodiments, user parameters comprise basic description of values which the user describes herself/himself with, herein referred to as preconditions. Furthermore, in some embodiments, the user parameters may additionally or alternatively comprise prerequisites the user imposes on potential groups. In some embodiments, the preconditions or prerequisites may be manually entered by the user, system generated, or a combination thereof. For example, in some embodiments, the system may generate one or more of the preconditions and prerequisites regarding the user based on game play behavior of the user.

In some embodiments, the user parameters are published by the user when the recruiting system is generated. In some embodiments, the user parameters may be published when the user first subscribes to the system and/or when the user first advertises that he/she is seeking to join a group. In some embodiments, the system may generate system based parameters and may supplement the published user parameters with the system generated parameters. In an additional or alternative embodiment, the user parameters may be updated at any time by the user and/or system. In some embodiments, the user parameters may be stored within a user profile, as shown for example in FIG. 6.

Next, in step 150 (FIG. 1), the system compares the group parameters retrieved in step 120 with each of the user parameters retrieved in step 140. In some embodiments, upon comparing the group parameters and user parameters, the system generates a score. In some embodiments, this step comprises comparing both group prerequisites and preconditions of the groups against the user prerequisites and preconditions. That is, in some embodiments, the system may determine whether each user meets those requirements of the group that have been identified as prerequisites for potential members. For example, in some embodiments, where the group parameters indicate that a member in a specific geographic area is preferred, the system will determine which of the users are within the area or within the vicinity of the area.

In some embodiments, these prerequisites may be binary, non-binary and or a combination of binary and non-binary prerequisites. That is while some prerequisites may have a yes and no response and met or not met by the potential member, in other embodiments, some prerequisites may be non-binary and may indicate a range of values that may meet the criteria described by the prerequisite. For example, where the group parameters include a geo-location prerequisite, the prerequisite may be limited to a specific area. However, in other embodiments the geo-location prerequisite may indicate a location and the system may then determine the proximity of the user's location to the location rather than whether the user meets the specific location prerequisite.

In some embodiments, the prerequisites may be expressed as preferences or given weights such that the user's score or match will be only partially affected by the prerequisite. For example, in some embodiments, while several prerequisites are provided, one or more prerequisites may be weighted such that each will affect the system determination as to whether the user is a good match for the group or not based on a scale, rather than being determined as met or not met.

Furthermore, in one or more embodiments the system will determine the degree to which the user's characteristics and group's characteristics, i.e. preconditions, are a match. For example, the group's preconditions will be compared to the user's preconditions to determine if there is a similarity between the user and group characteristics such that they user will be a good member for the group. In some embodiments, this determination is added to the score from comparing the group prerequisites against the user preconditions.

In yet a further embodiment, the system may further determine whether the group meets the prerequisites of the user. As noted above, in some embodiments, users may be able to set prerequisites for groups they wish to join. In such embodiment, the system may further compare the group preconditions against the user prerequisites to determine a further score, which may also be added to the score generated from comparing group prerequisites and preconditions to user preconditions.

In some embodiments, these prerequisites may be binary, non-binary and or a combination of binary and non-binary prerequisites. That is while some prerequisites may have a yes and no response and met or not met by the potential group, in other embodiments, some prerequisites may be non-binary and may indicate a range of values that may meet the criteria described by the prerequisite. For example, where the user parameters include a geo-location prerequisite, the prerequisite may be limited to a specific area. However, in other embodiment the geo-location prerequisite may indicate a location and the system may then determine the proximity of the group's location to the location of the user rather than whether the group meets the specific location prerequisite.

In some embodiments, the prerequisites may be expressed as preferences or given weights such that the user's score or match will be only partially affected by the prerequisite. For example, in some embodiments, while several prerequisites are provided, one or more prerequisites may be weighted such that each will affect the system determination as to whether the user is a good match for the group or not based on a scale, rather than being determined as met or not met.

Furthermore, in one or more embodiments the system will determine the degree to which the user's characteristics and group's characteristics, i.e. preconditions, are a match. For example, the group's preconditions will be compared to the user's preconditions to determine if there is a similarity between the user and group characteristics such that they user will be a good member for the group. In some embodiments, this determination is further added to the score determined in this step.

In this manner, the above method of evaluating the user's as potential members for the groups provides a method of matching groups and potential members through a two way matching system.

Next, in step 160 the system may recommend one or more potential members to the group members/leaders. In some embodiments, the one or more potential members comprise members selected by the system according to the comparison and/or score generated in step 150. In some embodiments, for example, upon completing step 150, the system may recommend one or more potential members to the group. In some embodiments, the one or more potential members may comprise all users detected in step 130. In some embodiments, the potential members comprise one or more of the users detected in step 130. For example, in some embodiments, the one or more of the users may be selected according to the comparison performed and/or score calculated in step 150.

In some embodiments, the potential members recommended to the group may comprise those users that have been determined as matching the group based on the comparison performed and/or score generated in step 150. For example, in some embodiments, the system and/or group may impose a condition and will recommend all users which meet the condition according to the comparison step 150. For example, in some embodiments, the group and/or system may specify a certain match threshold and only users having met that match threshold are recommended to the group in step 160. In some embodiments, for example each user's score and/or other indication derived from the comparison in step 130, is compared to the match threshold. In such embodiments, if it is determined that the user meets or exceeds the match threshold, then that user is recommended to the group in step 160. In some embodiments, for example each user's score is compared to the match threshold and if the user score is greater than or equal to the match threshold, then that user is recommended as a potential member. In some embodiments, the users may further be ranked based on the comparison and/or the score generated during step 150. In some embodiments, the recommendations may be generated in several forms including a report and/or a cloud. These recommendation mechanisms are further described below with respect to FIGS. 9, 13A and 13B.

In some embodiments, when recommending the potential members, the recommended users may be ranked based on a score generated during step 150 such that the score for each user is indicated relative to other users. For example, where a report is being presented to the group when recommending the potential members, the report may comprise a sorted list of the users, with the users having the best match with the group higher on the list than those with lower matching scores and/or less desirable in view of the group and user parameters. In some embodiments, other differentiation mechanisms such as color, size, or other characteristics may be used to indicate the relative match between the user and the group.

In some embodiments, in addition to recommending users which meet a certain condition, the system may further recommend users based on other criteria. In one or more embodiments, for example, members of the group may be able to tag users for observation or may vote for one or more users before, during or after game play and those users may be added to the list of recommended potential members. For example, in some embodiments, the system allows members of the group to vote for other users, and users which receive votes from members of the group are added to the report. In some embodiments, votes/suggestions by the members of the group may be added to the score determined in step 150 to boost the user's score with respect to the group. In some embodiments, the votes/suggestions may be given a higher weight and/or relative importance than other parameters. In some embodiments, users having been tagged and/or voted for by the members of the group may be recommended to the group in step 160 even if they do not meet the match criteria and thus would not usually be recommended by the system.

In some embodiments, potential members may further be able to vote for the group or tag the group as a group of interest either before, during or after game play. In some embodiments, for example, users may be able to view a session of group play or activity for a potential group and may be able to tag the group as a group the player is interested in joining. In some embodiments, users may be able to indicate interest in joining a particular group. For example, in some embodiments, the users may be able to receive recommendations regarding groups and may select a group as being of particular interest. In such embodiments, the user may send a request to join the group. In some embodiments, users may request to observe and/or spectate a group activity of the group and may indicate an interest in the group. In some embodiments, potential members who have indicated interest in the group shift to the top of the group report and/or are highlighted for the group leaders. In some embodiments, votes/indications by the user may be added to the score determined in step 150 to boost the user's score with respect to the group. In some embodiments, such users may be recommended in step 160 even if they do not meet other recommendation criteria such as having a high enough score calculated in step 150.

Accordingly, according to several embodiments, during step 160, the group will receive a report, cloud or other potential member recommendation means based on one or more of criteria, i.e. group preconditions and prerequisites, weights and group voting/suggestion during game play with other users as well as user interest in the group.

In some embodiments, the recommendation means are automatically generated for all groups advertising that they are seeking members. In some embodiments, a group leader and/or member may log into the system and request to receive a recommendation of potential members. In some embodiments, the recommendation means may periodically be updated such that group members/leaders are able to observe and keep track of user activity. In some embodiments, group members may receive the recommendations and tag certain users for further observation. Thus the system provides a mechanism for the group leaders and/or members to view potential members before selecting their new members. These recommendation mechanisms may be delivered to group leaders/members via a computer, game console, web application and/or mobile device. In some embodiments, the recommendations may be generated in several forms including a report and/or a cloud, and displayed to the group.

In one or more embodiments the group leaders/member may monitor the one or more potential members and may select one or more potential members to be added to the group. For example, in some embodiments, once the group leaders and/or members have viewed the recommended potential members, the group members/leaders may then select one or more users to be invited to the group. In such embodiment, the system will send an invitation to the selected potential members and upon detecting that the potential member has accepted an invitation to join the potential member will be added to the group.

In a further embodiment, prior to adding a user to the group the group members or leaders may wish to invite one or more of the potential members to a trial or tryout sessions. In such embodiments, the system will generate a tryout session or will allow the user to join a group session in progress to enable users to view the potential members in action before inviting the potential members to join the group. The process for establishing a tryout session is further describe below.

In yet another embodiment, the group may designate the system to automatically send an invitation to one or more of the potential members and/or automatically invite one or more potential members to a trial/tryout without requiring further action from the group members. For example, in some embodiments, the system may automatically invite one or more of the potential members and/or automatically invite one or more potential members to a trial/tryout when those potential members meet certain criteria.

In some embodiments, the system may be authorized to automatically invite potential members to join the group or invite one or more potential members to a tryout session when a condition is met. For example, in some embodiments, the group or members of the group may designate the system to automatically add potential members to the group and/or invite one or more potential members to tryout for the group if those potential members have a matching score, i.e. the score calculated during step 150, that is above a certain threshold. In some embodiments, the group or member may designate the system to automatically add potential members to the group and/or invite one or more potential members to tryout for the group if those potential members meet a minimum number of the prerequisites set by the group or one or more criteria designated as having a weight that qualifies the potential member as a match for the group.

In such embodiment, the system, upon determining that the condition has been met, will send an invitation to the selected potential members and upon detecting that the potential member has accepted the invitation to join, the potential member will be added to the group.

Figure 2:
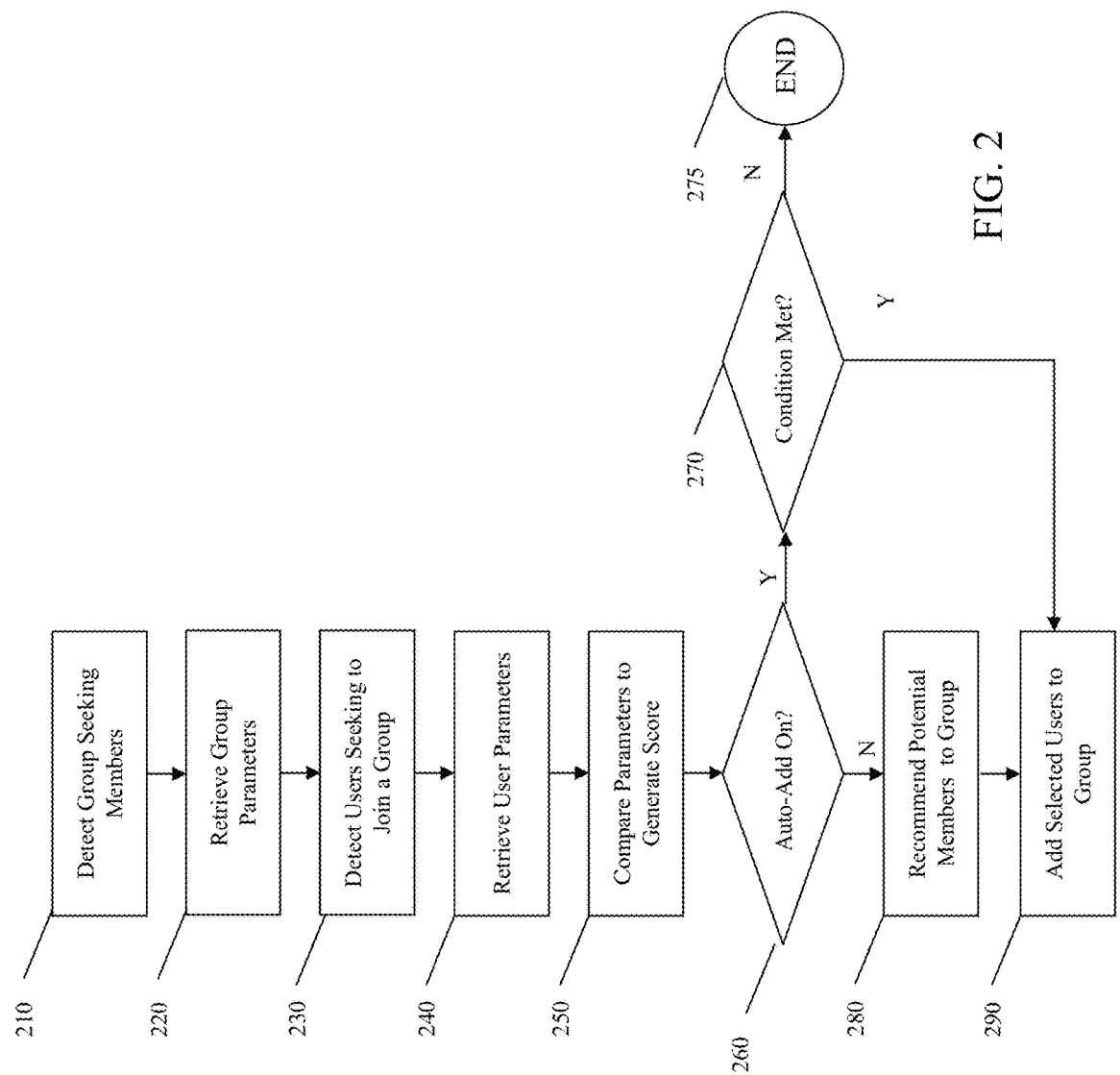
FIG. 2 illustrates a more detailed flow diagram of a method for recommending potential members to a clan/group seeking members, according to several embodiments of the present invention.

FIG. 2 illustrates a more detailed flow diagram of a method for recommending potential members to a clan/group seeking members, according to several embodiments of the present invention.

In one or more embodiments, steps 210-250 of the method are implemented according to some or all embodiments described above with respect to steps 110-150 of method illustrated in FIG. 1 and described above.

In step 210, the system detects groups seeking members. In response to the request, in step 220, the system retrieves group parameters for the group. Next, in step 230, the system detects one or more users seeking to join a group and continues to step 240 where user parameters for each of the users is retrieved. Next, similar to step 150 above, in step 250 the system compares group parameters and user parameters and may generate a score or other indication in response to the comparison.

In some embodiments, next, in step 260 the system determines whether the group has designated the system to automatically send members an invitation and/or add members to the group. In some embodiments, the group may designate the system to automatically add members to the group, send an invitation to one or more of the potential members to join the group, and/or automatically invite one or more potential members to a trial/tryout without any interference from the group members. In some embodiments, one or more conditions may be set such that when the conditions are met, the system may automatically add members to the group, send an invitation to one or more of the potential members to join the group, and/or automatically invite one or more potential members to a trial/tryout without requiring any further action from the group members.

For example, in some embodiments, the system may automatically add one or more potential members to the group, automatically invite one or more of the potential members to join the group and/or automatically invite one or more potential members to a trial/tryout when those potential members meet certain criteria. In some embodiments, the system may be authorized to automatically add potential members to the group, invite potential members to join the group or invite one or more potential members to a tryout session when a condition is met.

For example, in some embodiments, the group or member may designate the system to automatically add potential members to the group, or send an invitation to the member to join the group, and/or invite one or more potential members to tryout for the group if those potential members have a score, i.e. the score calculated during step 250, that is above a certain threshold. In some embodiments, the group or member may designate the system to automatically add potential members to the group and/or invite one or more potential members to tryout for the group if those potential members meet a minimum number of the prerequisites set by the group or one or more criteria designated as having a weight that qualifies the potential member as a match for the group. Such criteria may include meeting one or more of the prerequisites and preconditions, having a matching score, i.e. score calculated in step 250, that meets a threshold, number of votes received from one or more members of the group, and/or an indication of interest to join the group.

In some embodiments, one or more different sets of criteria may be set for each one of automatically adding users to the group, automatically sending invitations to the users to join the group and/or automatically sending an initiation to a user to tryout for a group. For example, in some embodiments the criteria for automatically adding potential members to the group or automatically sending invitations to users to join the group may include more stringent conditions than those for sending invitations to tryout, if the group has two or more sets of conditions. That is, the group may set different levels of conditions, at which a potential member may be automatically added or invited to join the group or at which the potential member will be invited to tryout for the group.

In such embodiments, in step 260 the system determines whether the group has designated the system to automatically send invitations to members meeting certain criteria or conditions. If it is determined that such designation has been set, in step 270, the system, determines whether the condition has been met. If in step 270, the system determines that the condition has been met then the process continues to step 290 and the potential member is automatically added to the group and/or an invitation is sent to the user. In some embodiments, whether the user is automatically added or whether an invitation is sent out may depend upon one or more of system preferences set by system developers, group preferences set by the group and/or set by the system based on monitoring the group, and/or user preferences set the user and/or the system based on monitoring the user. In some embodiments, as described above, the invitation may comprise one of an invitation for the user to join the group or an invitation to tryout for the group.

If on the other hand it is determined that no users, i.e. those users detected in step 230, meet the condition then the system may end the process in step 275. In some embodiments, upon determining that the condition has not been met, the system may alternatively continue to step 280 and provide the group with recommendations of potential members. In some embodiments, for example, while none of the users of step 230 meet the criteria for automatically receiving an invitation, the group members may still wish to receive recommended users and manually send invitations to users and/or add users to the group. In some embodiments, for example the system may, in step 280 provide a list of one or more of the users detected in step 230, for example as a report. In some embodiments, step 280 for recommending potential members to the group is performed similar to step 160 of FIG. 1 as described above.

Similarly, if in step 260 it is determined that the group has not designated the system to automatically add one or more members, and/or automatically send invitations to one or more potential members, then the process continues to step 280 and one or more potential members are recommended to the group similar to step 160 of FIG. 1. Upon receiving the recommendations in step 280, the group may select one or more potential members and may choose to add the potential members to the group and/or invite the potential members to a tryout session.

In some embodiments, during step 280, the group will receive a report, cloud or other potential member recommendation means based on one or more of criteria, i.e. group preconditions and prerequisites, weights and group voting/suggestion during game play with other users as well as user interest in the group.

Upon receiving the recommendations, in one or more embodiments, the group leaders/member may view the one or more potential members and may select one or more potential members to be added to the group or invited for trying out for the group. For example, in some embodiments, once the group leaders and/or members have viewed the recommended potential members, the group members/leaders may then select one or more users to be invited to the group or a tryout session.

Next, according to several embodiments, upon receiving selection of one or more members and/or upon detecting that conditions for automatically adding or inviting potential members have been met as described above, the process continues to step 290 to add the users to the group and/or send invitations to one or more potential members as described above. In some embodiments, in step 290, if based on one or more of system, group and/or user preferences the selected potential members should be added to the group, then those users are added and the process ends.

Otherwise, in step 290, the system will send an invitation to the selected potential members and wait for those members to accept the invitation. In some embodiments, users may receive a notification of receiving an invitation and may either accept or deny the invitation. In some embodiments, the selected potential members may designate the system to automatically accept invitations if certain conditions are met which may include for example the matching score between the group and users, whether the group meets certain criteria, etc. In some embodiments, upon detecting that the potential member has accepted an invitation to join the potential member will be added to the group.

Additionally or alternatively, in some embodiments, prior to adding a user to the group the group members or leaders may wish to invite one or more of the users to a trial or tryout sessions. In such embodiments, the system will generate a tryout session or will allow the user to join a group session in progress to enable users to view the potential members in action before inviting the potential members to join the group. The process for establishing a tryout session is illustrated below with respect to FIGS. 3 and 4. While in these exemplary embodiments, the tryout is described as being conducted within a single session, it should be understood by one of ordinary skill in the art that the group may invite the potential members to participate in several sessions within a specific trial session, or a specific number of sessions, to provide the group with an opportunity to assess the potential members.

In some embodiments, for selecting members for invites/tryouts, clan members can send invites or extend tryout requests from the player reports. In some embodiments, invites may be sent from mobile devices, consoles, or web applications, or other electronic interfaces. In some embodiments, invitations may be sent to members outside the game title and console. For example, this may include social network applications, email, mobile, other game titles, and other game platforms.

With respect to tryouts/trial period, some embodiments provide support for clans to establish tryouts/servers/times for potential members. In some embodiments, a potential player is offered a chance to participate in a single trial game with other clan members. After observing the recruit's game play, clan members are allowed to use in-game mechanics for voting yes or no. In some embodiments, the examples of in-game voting that is described herein may be used.

In some embodiments, a potential player is allowed a spectate ability to view the group's game play, behavior, and activity prior to joining. In some embodiments, after viewing a clan, a potential player can blacklist the clan to avoid appearance on the clan's reports. This may be before or after the potential player is involved in the recruitment process with a clan (e.g. requesting to join, appearing on clan's report, etc).

In some embodiments, the system provides for manual acceptance of potential recruits. For example, in some embodiments the clan leader or officers can at any time use the report to manually accept a potential recruit.

In some embodiments, the system provides for automatic invites or automatic acceptances of potential recruits. For example, as an optional feature, the recruitment system can automatically invite players that appear to be a strong candidate or who received a certain number of votes from clan members. Additionally, in some embodiments, the recruitment system can automatically accept requests-to-join from players. In some embodiments, these optional features preclude the need for member selection and tryouts.

Figure 3:
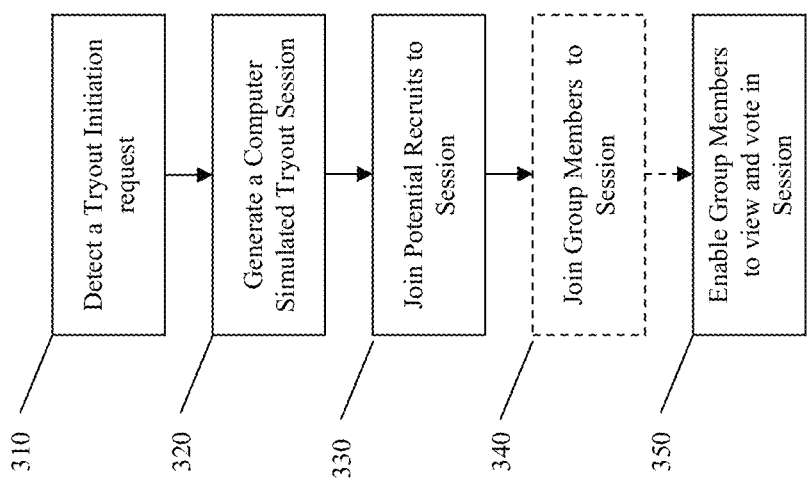
FIG. 3 illustrates a flow diagram of a first method for initiating a tryout session, according to several embodiments of the present invention.

Referring to FIG. 3, a flow diagram of a first method for initiating a tryout session is illustrated, according to several embodiments of the present invention.

The process begins in step 310 where the system detects a tryout initiation request. In some embodiments, the tryout initiation request is detected upon detecting that one or more potential members have accepted to tryout for a group. In some embodiments, a tryout session may be created for each potential member, upon detecting that the potential member has accepted the invitation to tryout. In some embodiments, the tryout invitation may comprise a particular tryout time which is indicated by group members/leaders and or the system. In some embodiments, the user upon being invited to try out for the group, may access the system and enter one or more identification data. In such embodiments, the system may detect that the user is a potential member desiring to tryout for the session. In some embodiments, the system may receive confirmations from one or more potential members and may then choose a specific time, and/or query the group member/leaders for such time, and may then initiate the tryout session at the specified time for some or all the potential members. In some embodiments, at such specified time the users may contact the system and the system may then begin the process for initiating the tryout-session.

Upon detecting a tryout initiation request, in step 320 the system generates a computer simulated tryout session. In some embodiments, the session may comprise a game, a group meeting, and/or other computer simulated session. In some embodiments, the tryout session is similar to the context in which the group usually operates, such that the behavior of the one or more potential members trying out for the group can be observed with respect to the activities the group usually takes part in.

Next, in step 330, the potential members are joined to the tryout session generated in step 320. As described above, in some embodiments, a tryout session may be initiated individually for each potential member. In some embodiments, two or more potential members may be joined to the same tryout session.

Optionally, in one or more embodiments, in step 340, the system may further allow one or more existing group members/leaders to join the tryout session, to interact with the potential members. In some embodiments, the group members/leaders may be active within the session, i.e. actually taking part in the activities of the session, or may just join to observe the one or more potential members taking part in the trial session.

Next, in step 350, once the one or more potential members and one or more group members have joined the tryout session, the process allows group members/leaders to observe the session and may further allow such members to vote for potential members. The group members may be able to vote for the potential members either during the tryout session or once the tryout session has concluded. Exemplary embodiments of in game voting and/or voting before, during or after a session is described in further detail below with respect to FIGS. 7 and 8.

Figure 4:
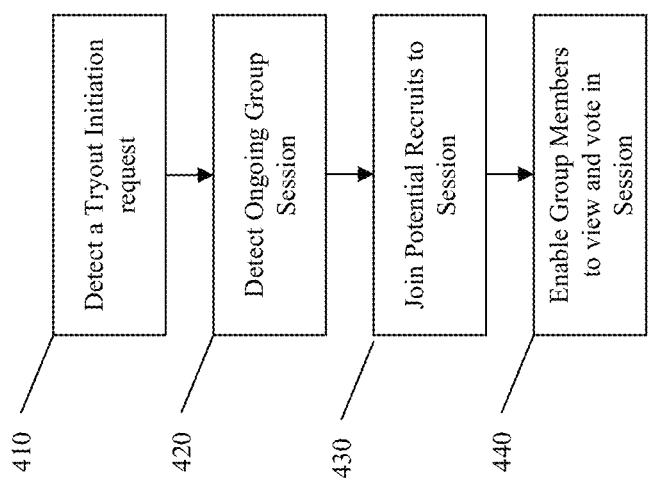
FIG. 4 illustrates a flow diagram of an alternative method for initiating a tryout session, according to several embodiments of the present invention.

FIG. 4 illustrates a flow diagram of an alternative method for initiating a tryout session, according to several embodiments of the present invention. In some embodiments, rather than generating a new session, the tryout may comprise inviting one or more potential members to take part in an already existing computer simulated session comprising one or more of the group members/leaders.

The process, in such embodiments, begins in step 410 where the system detects a tryout initiation request. In some embodiments, the tryout initiation request is detected upon detecting that one or more potential members have accepted to tryout for a group. In some embodiments, a tryout session may be created for each potential member, upon detecting that the member has accepted the invitation to tryout. In some embodiments, the tryout invitation may comprise a particular tryout time which is indicated by group members/leaders and or the system. In some embodiments, the user upon being invited to try out for the group, may access the system and enter one or more identification data. In such embodiments, the system may detect that the user is a potential member desiring to tryout for the session. In some embodiments, the system may receive confirmations from one or more potential members and may then choose a specific time, and/or query the group member/leaders for such time, and may then initiate the tryout session at the specified time for some or all the potential members. In some embodiments, at such specified time the users may contact the system and the system may then begin the process for initiating the tryout session.

Upon detecting a tryout initiation request, in step 420 the system detects an ongoing group session. In some embodiments, the group session comprises a computer simulated session. In some embodiments, the session may comprise a game, a group meeting, and/or other computer simulated session. In some embodiments, the group members/leaders may designate specific sessions which are detected as possible tryout sessions for potential members. In some embodiments, the system may determine which group sessions are scheduled and may query the group for authorization to allow potential members to join the group. In some embodiments, the specific group session may be included within the invitation sent to the members. In some embodiments, one or more possible sessions may be provided, and the potential member may choose amongst the sessions.

Next, in step 430, the potential members are joined to the ongoing group session detected in step 420. As described above, in some embodiments, one or more potential members may be joined to the ongoing group session.

Next, in step 440, once the one or more potential members have joined the tryout session, i.e. existing group session, the process allows group members/leaders to observe the session and may further allow such members to vote for potential members. The group members may be able to vote for the potential members either during the tryout session or once the tryout session has concluded. Exemplary embodiments of in game voting and/or voting before, during or after a session is described in further detail below with respect to FIGS. 7 and 8.

FIG. 5 illustrates one exemplary embodiment of a group profile having a set of parameters for an exemplary clan, according to some embodiments of the invention. In some embodiments, it is a basic depiction of values which a clan can describe itself with (i.e. preconditions). It may also highlight the prerequisites that clans can impose on potential recruits.

As illustrated, the group parameters comprise one or more preconditions, i.e. descriptive items, corresponding to the group such as language, style, and statistics are examples of clan preconditions. These exemplary parameters are some examples of characteristics that may be provided by the user profile, and are not an exhaustive list of possible information which may be provided with regard to the user. In one or more embodiments, the preconditions may be one or a combination of manually entered descriptive data and system generated data. For example, in some embodiments, the system may generate one or more of the preconditions and prerequisites regarding the group based on game play behavior of one or more members of the group. For example, in some embodiments, the clan statistics may be generated by the system as a result of monitoring the clan activities. In some embodiments, the system data may be generated from monitoring the group and/or one or more members during game play, while online and/or while performing offline activities.

Additionally, as shown in FIG. 5, the group parameters further comprise prerequisites, i.e., requirements the group imposes on potential members. For example, in this exemplary embodiment, the group prerequisites comprise whether the group requires the use of headsets or not, the group's calendar, as well as player required statistics. In an additional or alternative embodiment, groups may further impose location prerequisites based on server geo-location information. These exemplary parameters are some examples of characteristics that may be provided by the user profile, and are not an exhaustive list of possible information which may be provided with regard to the user. In one or more embodiments, the prerequisites may be one or a combination of manually entered descriptive data and system generated data. For example, in some embodiments, the system may generate one or more of the preconditions and prerequisites regarding the group based on game play behavior of one or more members of the group. In some embodiments, the system data may be generated from monitoring the group and/or one or more members during game play, while online and/or while performing offline activities. In some embodiments, preconditions and prerequisites of the group may be implemented via tags and represented via clouds, lists, or other means.

In some embodiments, one or more of the preconditions and prerequisites may be weighted while in other embodiments all parameters may be given equal weight. That is, in some embodiment one or more parameters may be more important when determining potential members for a group. In such embodiments, these parameters, i.e. preconditions or prerequisites, may be given a weight that is higher than other prerequisites or preconditions such that when determining the potential members those meeting the higher priority criteria and/or characteristics will be identified as being a better match than others who may meet other ones of the group parameters having less weight or priority. In some embodiments, the priority of weight of the parameters is assigned by one or more members of the group. For example, in some embodiments, group leaders may assign priority to those parameters which they deem the most important. In some embodiments, other users may additionally or alternatively be able to decide which parameters should receive the highest weight. In some embodiments, some or all weights may be determined and assigned by the system based on in game/session or other behavior of the group.

In some embodiments, clans can make locale prerequisites based on server geo-location information. For example, a clan may require members within a certain area (e.g. for support of meetings and get-togethers).

In a further embodiment, as an element of the group profile, or separately, the group may establish and offer verbalized clan incentives tied to recruiting to new recruits. Some examples may include weekly training sessions with group leaders, e.g. clan officers, or other members, or monthly recruits club meetings. In various embodiments, the incentive activities may be online or in person. For example, weekly training sessions with clan officers or monthly club meetings could be held at a pizza restaurant where new, local recruits get treated to free pizza, or somewhere else with an entirely different treat.

FIG. 6 illustrates one exemplary embodiment of a user profile having a set of parameters for an exemplary user, according to some embodiments of the invention. In some embodiments, it is a basic depiction of values which players can describe themselves with (i.e. preconditions). In some embodiments, in the case of players, the system can define stats based on game play.

As shown, preconditions, i.e. descriptive items, regarding the user such as language, user of headsets, calendar, style, and game play statistics may be listed in the user profile. These exemplary parameters are some examples of characteristics that may be provided by the user profile, and are not an exhaustive list of possible information which may be provided with regard to the user. In one or more embodiments, the preconditions may be one or a combination of manually entered descriptive data and system generated data. For example, in some embodiments, the system may generate one or more of the preconditions regarding the user based on game play behavior of the user. For example, in some embodiments, one or more of the user statistics data may be generated by the system as a result of monitoring the user's activities. In some embodiments, the system data may be generated from monitoring the user during game play, while online and/or during offline activities.

Additionally, while FIG. 6 only depicts the user profile as providing preconditions of the user, in one or more other embodiments user parameters may further comprise prerequisites, i.e., requirements the user imposes on clans/groups he or she would potentially like to join. In some embodiments, one or more of the preconditions and prerequisites may be weighted while in other embodiments all parameters may be given equal weight.

Figure 7:
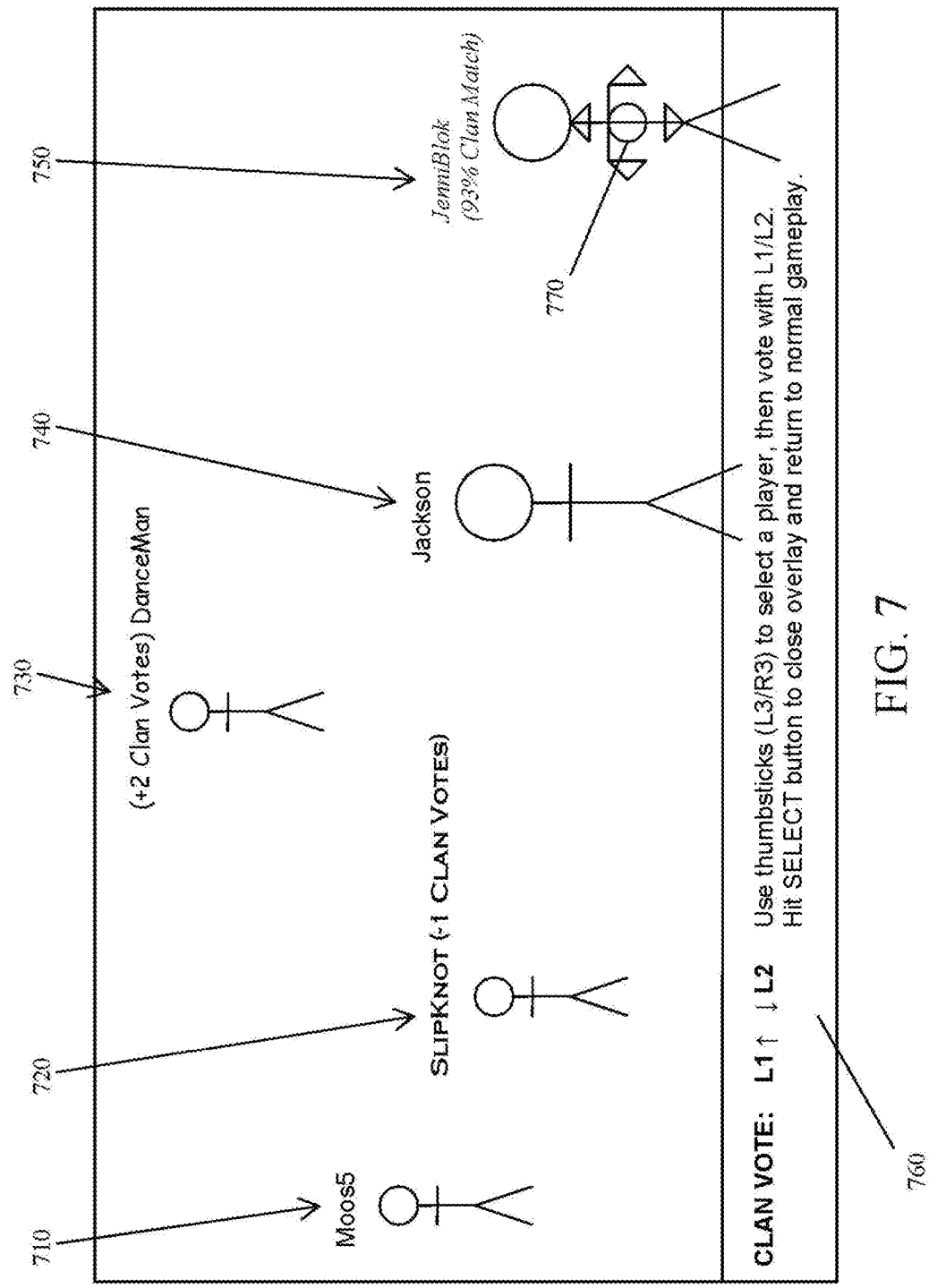
FIG. 7 illustrates an exemplary screenshot of a screen provided to the user enabling voting or tagging of users during the game, according to several embodiments of the present invention.

FIG. 7 illustrates one exemplary screenshot of a computer simulated session display screen with the in-game voting/tagging feature, according to one or more embodiments. That is, an example of in-game discovery is illustrated where, in some embodiments, clan members can identify and observe potential recruits while in-game, via automatic or tagged annunciation/highlighting of players. In some embodiments, players are seen in-game that are a potential clan recruiting match, including those that members have already voted for or against. In some embodiments, color coding may be used to help clan members identify recruits.

As illustrated in this exemplary embodiment, one or more users 710, 720, 730, 740 and 750 are shown on screen as taking part in the computer simulated session. In some embodiments, the computer simulated session may be a game or other activity that is conducted online and/or interactively. Thus, in some embodiments the screenshot may depict a scene of a game or other simulation, a scene in an online community, a scene in a virtual world, etc.

As shown, in some embodiments, the display screen allows users viewing the screen to see an identifier for other users within the computer simulated session. For example, users 710, 720, 730, 740 and 750 are each shown as having an identification, i.e. user name, above them to identify the user within the computer simulated session. Furthermore, each user 710, 720, 730, 740 and 750 may further include a clan tag or identification indicating if the user belongs to one or more clans. Still further, according to some embodiments, group members viewing the screen can distinguish those users that are a potential match for the group. For example, in the screen illustrated in FIG. 7, user 750 is identified as a potential member/recruit for the group.

Further, as illustrated in this embodiment, other information such as the score or match percentage of the potential members may further be displayed to the viewing user. Furthermore in this and other embodiments, those users that have received votes from other members of the group may further be distinguished. For example, as shown in FIG. 7, users 720 and 730 are identified as having received votes from other members within the group.

In some embodiments, color coding, the type of text font, the size of the text, or other similar effects may be used to distinguish potential members within the display screen. For example, in the screen of FIG. 7, the identifiers for users 720, 730 and 750 are represented in a different font than users 710 and 740. In some embodiments, the identifiers for users 720, 730 and 750 may be represented in a different color or shade than users 710 and 740. In some embodiments, potential members may further be distinguished relative to one another by color coding or other effects. In some embodiments, potential members may be distinguished to indicate their rank or match relative to one another.

As shown in FIG. 7, the user is presented with means for in game or in session voting or tagging of displayed users. For example, in some embodiments, a game overlay allows means to vote a potential recruit up/down for clan members. For example, in some embodiments, a band 760 appears on the screen providing the viewer with options for voting for a displayed user. In some embodiments, a cursor 770 may also be provided and used, which in the illustration is shown as presently being located on the user 750. In some embodiments, the cursor 770 may comprise any type of pointer, arrow, marker, indicator, or identifier, and may comprise any shape, configuration, color, shade, etc.

FIG. 7 illustrates the band 760 as being placed at the bottom of the screen. However, it should be understood to one skilled in the art that the means for in game or in session tagging and/or voting may take different forms and be presented anywhere viewable to the user. In some embodiments, the means for in game/in session voting appear in response to the viewing user selecting a displayed user and/or by selecting the option from a display or activating a button or other input means on any input device such as a controller, game pad, joystick, keyboard, mouse, etc.

In some embodiments, once the in game/in session voting band 760 appears, as shown in FIG. 7, the viewer is able to vote for a selected displayed user. In embodiments such as that of FIG. 7, the in game/in session voting band 760 may display instructions for in game/in session voting to enable the viewer to select and vote for different users. Once the viewer has selected and voted for a user, the vote or tag may be added to the selected user's profile and/or saved in a voting database for future retrieval. In some embodiments, once group members have voted for a user, the user will then be added to the group's list of potential members. Furthermore, in some embodiments, the user may now be displayed as having been voted for, and/or displayed as a potential member, by means such as color coding as described above.

In addition to being able to view and vote for users during a computer simulated session, group members are further able to vote or tag users before, during or after a session. FIG. 8 illustrates an exemplary screenshot of a screen provided to the user enabling voting or tagging of users before or after the game. In some embodiments, the screen may be a type of scoreboard, and players can highlight other players on the scoreboard and vote up/down to recommend potential recruits to other clan members.

In some embodiments, the screen of FIG. 8 is presented to the user once a session has concluded and/or the group member has decided to leave the session. In some embodiments, this is the connection between the in-game experience and the offline, out-of-game reports and reviewing. In some embodiments, the screen may be displayed at any time the member wishes to cast votes for different users. In some embodiments, the screen may appear if the user wished to vote for a user while a session is in progress.

As illustrated in FIG. 8, the screen comprises a list of users along with information about the users. In some embodiments, the list of users may comprise all users within a session that the voting member is or has been viewing or participating in. In some embodiments, the list may comprise a potential member list of recommended potential members. The list or report may comprise user information such as one or more group/clan tags identifying the groups or clans that the player may belong to. Statistical information regarding each user such as score, kills, assists deaths and ping, may further be displayed. The list may further comprise other information regarding the user. In some embodiments, each user is represented in the list using the user's ID. In some embodiments, the member or viewer of the list is able to select a player by selecting the user's ID using input means such as a controller, game pad, joystick, mouse, keyboard, touch or other similar means. In some embodiments, upon selecting the user, a voting band 810 will appear allowing the member to vote for the selected user. In some embodiments, voted recruits will appear on the clan's player reports.

In both in session or pre/post session voting, positive and negative votes may be cast for a user, according to some embodiments. In other embodiments, the system may only allow a positive voting mechanism. In some embodiments, additionally or alternatively, a user may be able to use a free form commenting mechanism to express an opinion of other users. For example, a text box may be provided allowing the member to enter a comment regarding the user. The comment can be presented in the group report along with other information to assist the group in determining which recommended users should be selected as members of the group.

Next referring to FIG. 9, an exemplary report 900 generated for a group recruiting members is illustrated, according to several embodiments of the present invention. That is, an example of a report for player discovery for clans or other groups is shown. In some embodiments, it may be referred to as a clan recruitment report, with potential recruits shown along with clan votes and other information. In some embodiments, clans or other groups receive automatic reports of players based on criteria, weights, and clan member voting/suggestions during game play with other users. In some embodiments, reports may be delivered via console, web application, or mobile device. In some embodiments, potential recruits who receive positive votes from clan members shift to the top of the clan report, highlighted for the clan leader/officers.

As illustrated, the report 900 lists one or more recommended potential members. In some embodiments, the recommended potential members may comprise some or all users detected during steps 130 and 230 of FIGS. 1 and 2 respectively. The report 900 lists potential members along with information regarding the potential members including one or more user preconditions and/or prerequisites retrieved, e.g. the perquisites and preconditions stored within the user profile as illustrated in FIG. 6. In some embodiments, the information listed may be similar for all reports generated for every group recruiting members. In some embodiments, the report may be customized for each group. For example, in some embodiments the information listed for each user may be dynamically customized based on the group's prerequisites, such that those characteristics listed by the group as bearing importance are listed. In some embodiments, the report may be customized by the system to display the items which were used in determining a match and/or matching score between the user and the group.

For example, in this exemplary embodiment, potential members are listed along with information such as whether the user uses a headset, user statistics such as total points, kills per hour, player hours, and location information. Furthermore, the report further illustrates the number of votes the each user has received from members of the group/clan. As illustrated, members of the group may vote both positively and negatively for each user. In further embodiments, other information may further be provided on the report. In some embodiments, for example, where users are able to indicate an interest in the group, this data may further be listed in the report to alert the group that one or more users have particular interest to be a member of the group.

In some embodiments, the potential members are listed on the recruitment report 900 by rank. That is, in some embodiments, the report ranks users in terms of the best match for the group. In some embodiments, this rank may be based on comparing the matching score for the users and ranking the users with the best match being listed on top of the list. As illustrated, in some embodiments, the matching score may be depicted as a percentage as shown in the exemplary report 900.

In some embodiments, the report 900 may be generated and displayed via a computer and/or game console. In some embodiments, the displayed report may further enable members of the group to select a user from the list, and view more information about that user, vote for the user, invite the user for a tryout or trial session, or select the user as a member of the group. For example, as shown in FIG. 9, in some embodiments the report display may comprise an information button 910 for acquiring more information. In addition to information regarding each potential member, other information may also be provided to the group. For example, in some embodiments, information regarding the different components of the report, the overall recruitment system, the group criteria, the matchmaking process, and/or other related information may be provided to a group member or leader when the information button is pressed. Furthermore, in some embodiments, when viewing the report 900, the group members or leaders are able to select the edit all button 920 at the bottom of the report and may vote for users or may further change their vote previously posted regarding a user.

In some embodiments, the look of the reports may vary for each member according to different system based or group based criteria. For example in some embodiments, the criteria may comprise member access rights, rank, position, etc. In some embodiments, the same report windows may be displayed for all members, but some or all of the buttons may be grayed out, or may only perform a limited function according to similar criteria. While in this exemplary embodiment the report of the potential members is displayed as being a single display, it should be understood by one of ordinary skill in the art that the potential member report may be presented in different formats and in different numbers of pages to the user to accommodate different displays or platforms.

Figure 10:
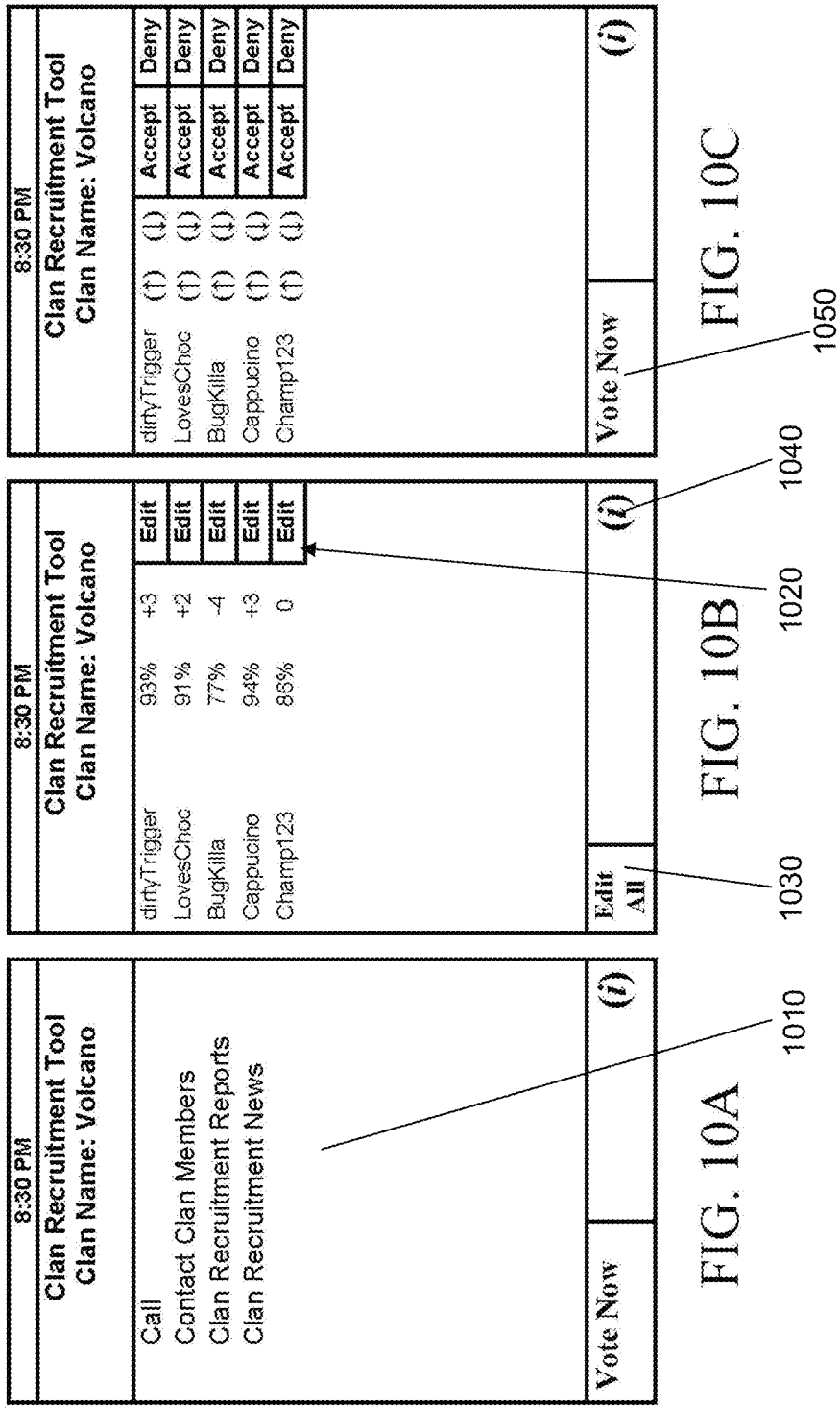
FIGS. 10A, 10B, and 10C illustrate a clan recruitment application enabling one or more members of a group to interact with the recruitment system of the present invention, according to several embodiments of the present invention.

In some embodiments, the clan recruitment system may be displayed to one or more group/clan members/leaders through an application. The application may comprise one or more user interface displays. FIGS. 10A, 10B, and 10C illustrate a clan recruitment application enabling one or more members of a group to interact with the recruitment system of the present invention. The application may for example be generated and/or displayed via a mobile device, tablet, PC, portable gaming device, computer, and/or other consumer electronics devices. As shown, the application comprises multiple display windows, labeled as FIGS. 10A, 10B and 10C. While the application is illustrated as having three separate windows, it should be understood by one of ordinary skill in the art that the potential member application may be presented in many different formats and in different numbers of display windows to the user to accommodate different displays or platforms as well as system or user preferences. By way of example, in some embodiments, three screens with functionality like home screen, voting, and view reports may be implemented in a mobile phone application, mobile device application, tablet device application, pad-like device application, etc.

As illustrated, the application comprises a first display in FIG. 10A for displaying a menu 1010 providing the group members and/or leaders with various functionality such as contacting clan members, generating clan reports, and/or receiving clan reports. In some embodiments, the member/leader will select the clan recruitment reports option to view a report of potential members. In some embodiments, the report is generated and displayed on a second window. As mentioned above, the amount of information presented in the report may vary depending on the display restrictions. For example, in this exemplary embodiment, the report is generated to be displayed on a mobile device so the user views a summarized report with only certain information shown to the user. The amount and type of information displayed may be determined by the system or may be set by the user viewing the report.

Once the group member/leader views the report, the member can then select a potential member from the list, and view more information about that potential member, vote for the potential member, invite the potential member for a tryout or trial session, or select the potential member as a member of the group. For example, as illustrated in FIG. 10B the list may comprises an edit button 1020 next to each potential member in addition to an edit all button 1030, allowing the member or leader to view more information about that user, vote for the user, invite the user for a tryout or trial session, or select the user as a member of the group. Furthermore the display in FIG. 10B may comprise an information button 1040 for acquiring more information. In addition to information regarding each potential member, other information may also be provided to the group. For example, in some embodiments, information regarding the different components of the report, the overall recruitment system, the group criteria, the matchmaking process, and/or other related information may be provided to a group member or leader when the information button is depressed.

In some embodiments, when the group member/leader views the report on the display in FIG. 10B, the member/leader may then choose to make selections with respect to one or more of the potential members. Thus in some embodiments, the member/leader will select to advance to a voting screen shown in FIG. 10C. In some embodiments, once the leader/members press the edit button 1020 and/or edit all button 1030 within the display of FIG. 10B, they may be presented with a list of options for each potential member or an individual potential member, for example as shown in the display of FIG. 10C. In some embodiments, the voting screen/display in FIG. 10C provides the members of the group with the ability to vote for a potential member or may further change their vote previously posted regarding the potential member. In one exemplary embodiment, as illustrated in FIG. 10C, the user is able to further vote for one or more potential members to be recruited using the vote now button 1050. In some embodiments, one or more members may use the vote now button 1050 to select recruits as members and/or to invite members to tryout sessions.

In some embodiments, the look of the application and reports may vary for each member according to different system based or group based criteria. For example in some embodiments, the criteria may comprise member access rights, rank, position, etc. In some embodiments, the same windows may be displayed for all members, but some or all of the buttons may be grayed out, or may only perform a limited function according to similar criteria.

The present system similarly enables users seeking to join groups to receive recommendation mechanisms regarding the clans/groups.

Figure 11:
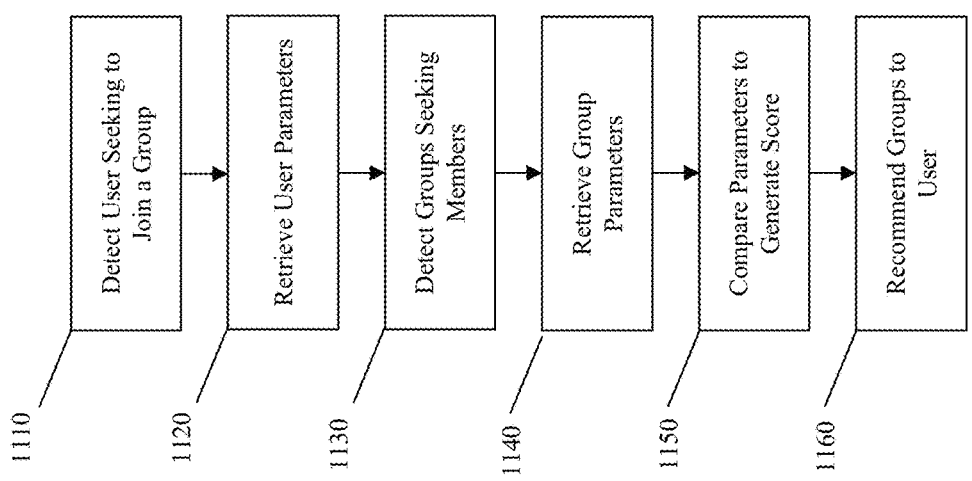
FIG. 11 illustrates an exemplary flow chart of a method for recommending potential groups to a first user seeking to join a group, according to several embodiments of the present invention.

Referring first to FIG. 11, an exemplary flow diagram of a method for recommending potential groups to a first user trying to join a group is illustrated according to some embodiments.

First in step 1110, a first user seeking to join a group is detected. For example, in some embodiments, a request is received from a user seeking to join at least a first group. For example, in some embodiments, one or more users may advertise their availability and seek to join clans/groups. In some embodiments, for example, users may join the system and provide their characteristics and criteria and may then indicate that they are looking for groups to join. In some embodiments, users may be queried based on their characteristics whether they are available to join groups.

In step 1120, the system retrieves user parameters for the first user detected in step 1110. In some embodiments, user parameters comprise basic description of values which the user describes herself/himself with, herein referred to as preconditions. Furthermore, in some embodiments, the user parameters may additionally or alternatively comprise prerequisites the user imposes on potential groups. In some embodiments, the preconditions or prerequisites may be manually entered by the user, system generated, or a combination thereof. For example, in some embodiments, the system may generate one or more of the preconditions and prerequisites regarding the user based on game play behavior of the user.

In some embodiments, the user parameters are published by the user when the recruiting system is generated. In some embodiments, the user parameters may be published when the user first subscribes to the system and/or when the user first advertises that he/she is seeking to join a group. In some embodiments, the system may generate system based parameters and may supplement the published user parameters with the system generated parameters. In an additional or alternative embodiment, the user parameters may be updated at any time by the user and/or system. In some embodiments, the user parameters may be stored within a user profile, as shown for example in FIG. 6.

Next, in step 1130, the system detects one or more groups seeking to recruit members. That is, in some embodiments, the system may retrieve a list of one or more groups seeking members. For example, in some embodiments, a request is received from a group seeking to recruit one or more members. In some embodiments, the system enables groups or clans to advertise their open recruitment and seek one or more potential members to invite. In some embodiments, clans, for example may inform the system of having one or more openings and may further provide one or more criteria for the new members of the group or clan.

In step 1140, the system retrieves group parameters or profile information for each group detected in step 1130. In some embodiments, group parameters comprise preconditions, i.e., basic descriptive items representing the overall characteristics of the group. Furthermore, in some embodiments, the group parameters may additionally or alternatively comprise prerequisites the group imposes on potential members. In some embodiments, the preconditions or prerequisites may be manually entered by one or more members of the group, system generated, or a combination thereof. For example, in some embodiments, the system may generate one or more of the preconditions and prerequisites regarding the group based on game play behavior of one or more members of the group.

In some embodiments, the group parameters are published by the group when the recruiting system is generated. In some embodiments, the group parameters may be published when the group first subscribes to the system and/or when the group advertises recruitment. In some embodiments, the system may generate system based parameters and may supplement the published group parameters with the system generated parameters. In an additional or alternative embodiment, the group parameters may be updated at any time by the members of the group and/or by the system. In some embodiments, the group parameters may be stored within a group profile, as shown for example in FIG. 5.

Next, in step 1150, the system compares the user parameters retrieved in step 1120 with each of the group parameters retrieved in step 1140. In some embodiments, upon comparing the group parameters and user parameters, the system generates a score.

In one or more embodiments the system will determine the degree to which the user's characteristics and group's characteristics, i.e. preconditions, are a match. For example, the group's preconditions will be compared to the user's preconditions to determine if there is a similarity between the user and group characteristics such that the user will be a good member for the group. In some embodiments, this determination is added to the score from comparing the group prerequisites against the user preconditions.

In a further embodiment, the system may determine whether the first user meets those requirements of the first user that have been identified as prerequisites for potential groups. Furthermore, in some embodiments, users may be able to set prerequisites for groups they wish to join. In such embodiment, the system may further compare the group preconditions against the user prerequisites to determine a further score, which may also be added to the score generated from comparing group prerequisites and preconditions to user preconditions.

In this manner, the above method of evaluating the groups seeking members as potential groups for the first user provides a method of matching users and potential groups through a two way matching system.

Next, in step 1160 the system may recommend one or more potential groups to the first user. In some embodiments, the one or more potential groups comprise groups selected by the system according to the comparison and/or score generated in step 1150. In some embodiments, for example, upon completing step 1150, the system may recommend one or more potential groups to the first user. In some embodiments, the one or more potential groups may comprise all groups detected in step 1130. In some embodiments, the potential groups comprise one or more of the groups detected in step 1130. For example, in some embodiments, the one or more of the groups may be selected according to the comparison performed and/or score calculated in step 1150.

In some embodiments, the potential groups recommended to the first user may comprise those groups that have been determined as matching the first user based on the comparison performed and/or score generated in step 1150. For example, in some embodiments, the system and/or the first user may impose a condition and the system will recommend all groups which meet the condition according to the comparison step 1150. For example, in some embodiments, the first user and/or system may specify a certain match threshold and only groups having met that match threshold are recommended to the first user in step 1160. In some embodiments, for example each group's score and/or other indication derived from the comparison in step 1150, is compared to the match threshold. In such embodiments, if it is determined that the group meets or exceeds the match threshold, then that group is recommended to the group in step 1160. In some embodiments, for example each group's score is compared to the match threshold and if the group score is greater than or equal to the match threshold, then that group is recommended as a potential group. In some embodiments, the groups may further be ranked based on the comparison and/or the score generated during step 1150. In some embodiments, the recommendations may be generated in several forms including a report and/or a cloud. In some embodiments, a report similar to the potential member report of FIG. 9 may be generated for the potential groups. In some embodiments, the first user can navigate through the potential groups using clan/group clouds. This mechanism is further described with respect to FIG. 13.

In some embodiments, when recommending the potential groups, the recommended groups may be ranked based on a score generated during step 1150 such that the score for each group is indicated relative to other groups. For example, where a report is being presented to the first user when recommending the potential groups, the report may comprise a sorted list of the potential groups, with the groups having the best match with the first user higher on the list than those with lower matching scores and/or less desirable in view of the group and user parameters. In some embodiments, other differentiation mechanisms such as color, size, or other characteristics may be used to indicate the relative match between the first user and the one or more potential groups.

In some embodiments, in addition to recommending groups which meet a certain condition, the system may further recommend groups based on other criteria.

For example, in some embodiments, the first user may vote for one or more groups or tag the groups as a group of interest either during or after game play. In some embodiments, for example, users may be able to view a session of group play or activity for a potential group and may be able to tag the group as a group the player is interested in joining. In some embodiments, users may be able to indicate interest in joining a particular clan or group. According to some embodiments, the user first may request to observe and/or spectate a group activity of the clan or group and may indicate an interest in the group. In some embodiments, groups having been tagged and/or voted for by the first user may be included as a potential group in step 1160 even if they do not meet the match criteria and thus would not usually be recommended by the system.

In further embodiments, members of a group may be able to tag a user for observation or may vote for the first user during or after game play. In some embodiments, votes/suggestions by the members of the group may be added to the score determined in step 1150 to boost the group's score with respect to the first user. In some embodiments, the votes/suggestions may be given a higher weight and/or relative importance than other parameters.

Accordingly, according to several embodiments, during step 1160, the first user will be presented a report, cloud or other potential member recommendation means based on one or more of criteria, i.e. user parameters, group preconditions and prerequisites, weights, group voting/suggestion during game play, as well as user interest in the group.

In some embodiments, the recommendation means are automatically generated for all users advertising that they are seeking members. In some embodiments, the first user may log into the system and request to receive a recommendation of potential groups. In some embodiments, in one or both such embodiments, the recommendation means may periodically be updated such that user are able to observe and keep track of group activity. In some embodiments, the first user, as well as other users, may receive the recommendations and tag certain groups for further observation. Thus the system provides a mechanism for the first user to view potential members before selecting to join a group. These recommendation mechanisms may be delivered to the first user via a computer, game console, web application and/or mobile device. In some embodiments, the recommendations may be generated in several forms including a report and/or a cloud.

In one or more embodiments, after receiving the recommendations in step 1160, the first user may monitor the one or more potential groups and may select to join one or more potential groups. In such embodiment, the system will send a request to join to the selected potential groups and upon detecting that the potential group has accepted the first user's request to join the first user will be added to the group.

In a further embodiment, prior to adding a user to the group the group members or leaders may wish to invite one or more of the users to a trial or tryout sessions. In such embodiments, the system will generate a tryout session or will allow the first user to join a group session in progress to enable the group and first user to assess one another before the first user is accepted as a member of the group. The process for establishing a tryout session is further describe above with respect to FIGS. 3 and 4.

In some embodiments, the first may designate the system to automatically send a request to join to one or more of the potential groups without requiring any further action from the first user. For example, in some embodiments, the system may automatically detect one or more groups as desirable groups for the first user, e.g. based on determining that certain potential groups meet certain criteria, and may automatically send a request for the user to join those groups.

In some embodiments, the system may be authorized to automatically send such request when a condition is met. For example, in some embodiments, the first user may designate the system to automatically send a request to a group if the potential group has a matching score, i.e. the score calculated during step 1150, that is above a certain threshold. In some embodiments, the first user may designate the system to automatically add the user as a member of the group if the group meets a minimum number of the prerequisites set by the first user or one or more criteria designated as having a weight that qualifies the potential group as a match for the first user.

In such embodiment, the system, upon determining that the condition has been met, will send a request join to the selected potential groups and upon detecting that the group has accepted the request to join the first user will be added to the group.

Figure 12:
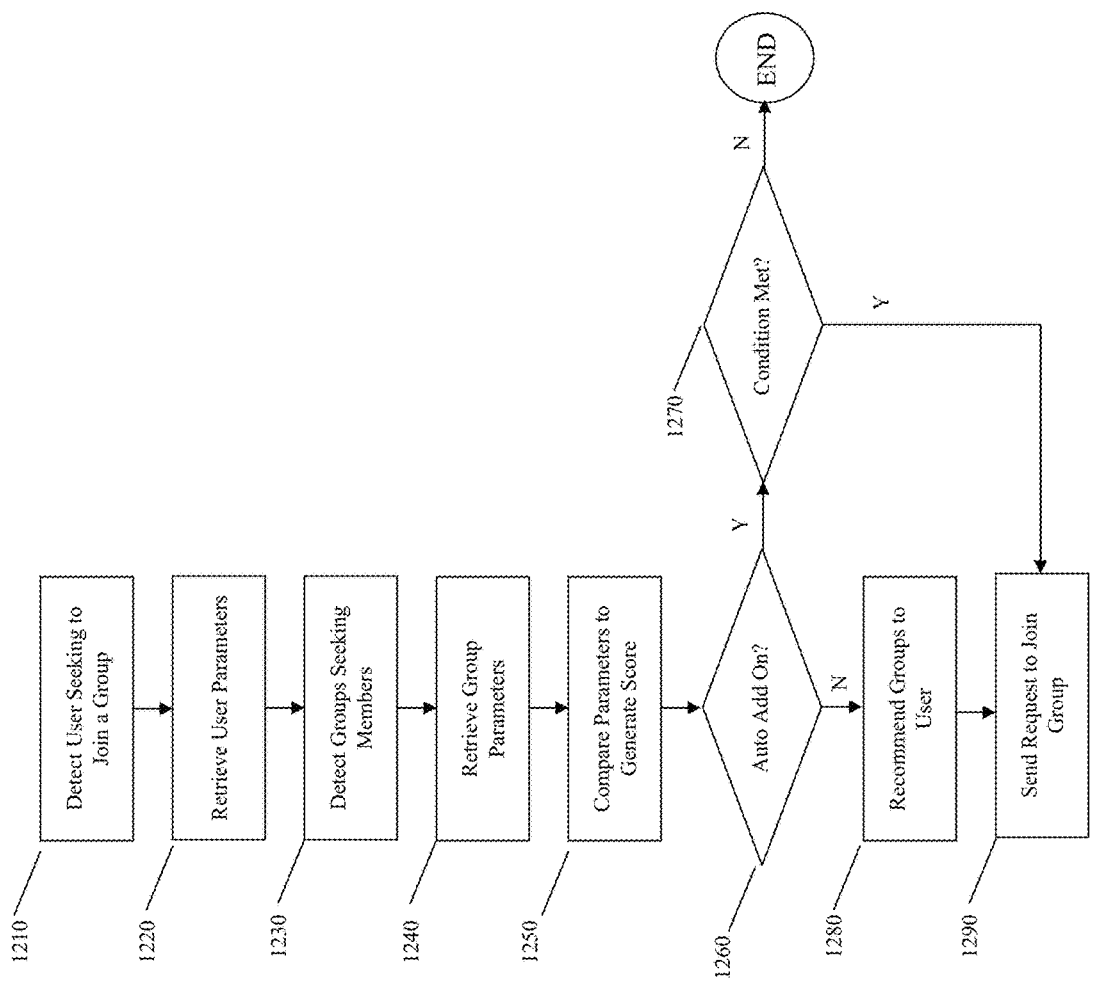
FIG. 12 illustrates a more detailed flow diagram of a method for recommending potential groups to a first user seeking to join a group, according to several embodiments of the present invention.

FIG. 12 illustrates a more detailed flow diagram of a method for recommending potential groups to a first user seeking to join a group.

In one or more embodiments, steps 1210-1250 of the illustrated method may be implemented according to some or all embodiments described above with respect to steps 1110-1150 of the method illustrated in FIG. 11 and described above.

In step 1210, the system detects a first user seeking to join one or more groups. In response to the request, in step 1220, the system retrieves user parameters for the first user. Next, in step 1230, the system detects one or more groups recruiting members and continues to step 1240 where group parameters for each of the one or more groups is retrieved. Next, similar to step 1150 above, in step 1250 the system compares group parameters and user parameters and may generate a score or other indication in response to the comparison.

In some embodiments, next, in step 1260 the system determines whether the first user has designated the system to automatically send potential groups a request to join. In some embodiments, the first user may designate the system to automatically sent a request to one or more potential groups meeting certain conditions and/or criteria. In some embodiments, one or more conditions may be set such that when the conditions are met, the system may automatically send those groups meeting such conditions a request to join from the first user.

For example, in some embodiments, the system may automatically send a request to join or add a user to a group when the group meets certain criteria and/or when a condition is met. For example, in some embodiments, the first user may designate the system to automatically send a request to join to potential groups or group if those potential groups have a score, i.e. the score calculated during step 1250, that is above a certain threshold. In some embodiments, the first user designates the system to automatically send a request to join or add the user to a group if the group meets a minimum number of the prerequisites set by the user.

In such embodiments, when in step 1260 it is determined that the user has authorized automatic request to join to be sent, in step 1270, the system, determines whether the condition or criteria set by the first user have been met. If in step 1270, the system determines that the condition and/or criteria have been met then the process continues to step 1290 and the first user is automatically added to the group and/or a request to join is sent to the group(s). In some embodiments, whether the user is automatically added or whether an invitation is sent out may depend upon one or more of system preferences set by system developers, group preferences set by the group and/or set by the system based on monitoring the group, and/or user preferences set by the user and/or the system based on monitoring the user.

If on the other hand, in step 1270, it is determined that no groups meet the condition then the system may end the process. In some embodiments, upon determining that the condition has not been met, the system may alternatively continue to step 1280 and provide the first user with recommendations of potential groups.

Similarly, if in step 1260 it is determined that the user has not designated the system to send automatic requests to join, then the process continues to step 1280 and one or more potential groups are recommended to the user similar to step 1160 of FIG. 11.

In some embodiments, during step 1280, the user will receive a report, cloud or other potential group recommendation means based on one or more of criteria, i.e. user preconditions and prerequisites, weights and group voting/ suggestion during game play with other users as well as group interest in the user.

In some embodiments, the recommendation means are automatically generated for all users advertising that they are seeking groups. In some embodiments, a user may log into the system and request to receive a recommendation of potential groups. In some embodiments, in one or both such embodiments, the recommendation means may periodically be updated such that users are able to observe and keep track of group activity. In some embodiments, users may receive the recommendations and tag certain groups for further observation. Thus the system provides a mechanism for the users to view potential groups before selecting their new group. These recommendation mechanisms may be delivered to users via a computer, game console, web application and/or mobile device. In some embodiments, the recommendations may be generated in several forms including a report and/or a cloud.

Upon receiving the recommendations in step 1280, the user may select one or more potential groups and may send a request to join such groups.

Next, according to several embodiments, upon receiving selection of one or more groups by the user and/or upon detecting that the conditions for automatically sending a request to join a group have been met in step 1270, as described above, the process continues to step 1290 and sends the request to join to the one or more selected groups. Upon sending the request to potential groups, according to some embodiments, then system will wait for an acceptance of the request. In some embodiments, groups, e.g. group members or leaders, may receive a notification of receiving a request and may either accept or deny the request. In some embodiments, the selected groups may designate the system to automatically accept requests if certain conditions are met which may include for example the matching score between the group and/or users, whether the requesting user meets certain criteria, etc. In some embodiments, upon detecting that the potential group has accepted the first user's request to join the first user will be added to the group.

Additionally or alternatively, in some embodiments, prior to adding a user to the group the group members or leaders may wish to invite the first user to a trial or tryout sessions. In such embodiments, the system will generate a tryout session or will allow the first user to join a group session in progress to enable the group members to view the first user in action before accepting the first user's request to join the group. One process for establishing a tryout session is described above with respect to FIGS. 3 and 4.

As described above, in one or more embodiments, the recommendations for one or more potential members or groups may be provided through a plurality of clouds. In some embodiments, each cloud corresponds to a characteristic or attribute of a group or user. Groups and users will be referred to herein generically as "items". That is, in some embodiments a plurality of items comprises a plurality of users, and in some embodiments a plurality of items comprises a plurality of groups.

In some embodiments, each cloud comprises a plurality of visual identifiers each corresponding to one of the plurality of items. By way of example, a visual identifier may comprise the text of the name of the user or group. In some embodiments, each visual identifier comprises a first visual attribute and a second visual attribute. In one or more embodiments, the first visual attribute comprises visual indicia of a ranking of the item represented by the visual identifier compared to the other items of the plurality of items according to the characteristic represented by the cloud. For example, if the characteristic represented by the cloud is group (or clan) size, then the first visual attribute comprises visual indicia of a ranking of the group represented by the visual identifier compared to the other groups according to group size. By way of example, in some embodiments the visual indicia of the first visual attribute may comprise the size of the text of the visual identifier.

In some embodiments, the second visual attribute comprises visual indicia of a ranking of the item represented by the visual identifier compared to the other items of the plurality of items according to a score. In some embodiments, the score is derived by comparing a first set of parameters corresponding to each item of the set of items with a second set of parameters corresponding to the item, i.e. either a user or a group, viewing the cloud. By way of example, in some embodiments the visual indicia of the second visual attribute may comprise a darkness, brightness, shade, colorization, or the like, of the text of the visual identifier. For example, the darkness, brightness, shade, or colorization of a group name may reflect the strength of match between the user and the group.

Figure 13A:
FIGS. 13A and 13B illustrate clan clouds for navigating through potential groups/clans, according to several embodiments of the present invention.
Figure 13B:

Referring to FIGS. 13A and 13B, an example of clan clouds for navigating through potential groups/clans is illustrated. In some embodiments, a clan cloud is generated, displayed, depicted, etc., on a display screen, such as for example any type of display screen used with a computer, mobile device, handheld device, etc.

Users can navigate through a community of a plurality of groups through the use of such clan clouds. In some embodiments, several clan clouds may be presented to a user each corresponding to a primary characteristic or attribute of the group, e.g. clan size as shown in FIG. 13A and clan win percentage shown in FIG. 13B. Any other characteristics or attributes of the clan may be represented by the one or more clan clouds. In some embodiments, as shown each clan cloud includes a plurality of visual identifiers for the plurality of clans represented within the cloud. For example, as shown in FIGS. 13A and 13B each cloud's text entry is a clan name.

In some embodiments, each clan identifier comprises a first visual attribute used to reflect the primary characteristic of the cloud for each clan relative to the other clans represented within the cloud. For example, the first visual attribute may comprise the size of the text of the identifier, e.g. clan name. In FIG. 13A, the size of the clan name text indicates the clan size relative to the other clans, while in FIG. 13B, the size of the clan name text indicates each clan's win percentage relative to the other clans.

Furthermore, in some embodiments, the clan identifier comprises a second visual attribute which indicates a degree of match between each clan and the user viewing the clan clouds. In some embodiments, the match is determined based on the comparison and/or the score calculated in step 1150 and 1250. In some embodiments, for example, as shown in FIGS. 13A and 13B, in a grayscale color scheme, the degree of brightness or darkness of the clan names reflects the strength of match between the user and the clan. In some embodiments, for example, the darker the clan name, the worse the match, and the lighter the clan name, the better the match. As another example, in some embodiments with a color scheme, the colorization of the clan names reflect the strength of match between the user and the clan. In some embodiments, for example, the farther to the red end of the spectrum, the worse the match, and the farther to the green end of the spectrum, the better the match. In several embodiments, this kind of interaction allows a unique, free-form navigation across the community and it allows users to utilize a multi-dimensional matching algorithm based on a primary criteria and secondarily on the multi-criteria recruiting matching algorithm.

Thus, clan clouds make navigating dozens, hundreds, or even thousands of clans in the gaming community very easy. For example, if a user wants to join a large clan, then the user can get the Clan Size Cloud (i.e. where clan size is a precondition of the clan), and find the user's best match based on his or her criteria and the clan's criteria. For example, in some embodiments, the greener the clan name, the better the match, and the redder the clan name, the worse the match. In some embodiments, the lighter the shade of the clan name, the better the match, and the darker the shade of the clan name, the worse the match, such as in a grayscale scheme. It should be understood that any such color/shade scheme can be used such that any color, shade, brightness, or darkness can be set to mean a better or worse match. Or, in some embodiments, some other scheme or mechanism may be used to indicate the strength of the match. As another example, if a user wants to join a clan with a high win percentage, then the user can get the Clan Win Percentage Cloud (i.e. where clan win percentage is a precondition of the clan). In some embodiments, left/right navigation allows traversal of various clouds. In some embodiments, menus, lists, or other means can be initially used to jump into a specific cloud as well.

While the clouds have been described with respect to the clan clouds, as described above, similar clouds may be created for one or more potential members and may be presented for viewing to a group member or leader. While the cloud is herein represented in a cloud shape, other shapes or configurations may be used according to several embodiments of the present invention.

Figure 14:
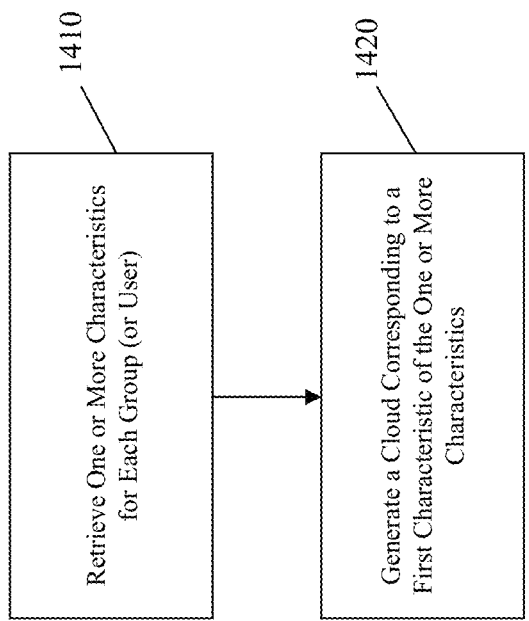
FIG. 14 illustrates a flow diagram of a method for generating a cloud, according to several embodiments of the present invention.

FIG. 14 illustrates an example method for generating a cloud in accordance with an embodiment of the present invention. The method may be used to generate any type of cloud, such as for example a clan cloud, team cloud, or other group cloud, or a user cloud. Specifically, in step 1410 one or more characteristics or attributes are retrieved for each group or user that is to be included in the cloud. In step 1420 a cloud is generated corresponding to a first characteristic of the one or more characteristics. In some embodiments, the cloud may be generated to include any of the features as described above and herein.

In some embodiments, one or more of the methods and techniques described herein may be tied in with social networking websites, professional networking websites, microblogging services, other similar websites and services, etc. For example, in some embodiments, information related to a team, clan, or other type of group may be posted to a website, such as for example a social networking website, professional networking website, etc. For example, the type of information that may be posted includes, but is not limited to, a notification that the status or other information for a group has changed, a notification that a group is actively recruiting new members, a notification that a group is holding tryouts, a notification that a group has extended an invitation to join to a user, game play pictures, video, and/or audio, profile information for members of a group, new members of a group, other information about a group, etc.

Similarly, in some embodiments, information related to a user may be posted to a website, such as for example a social networking website, professional networking website, etc. For example, the type of information that may be posted includes, but is not limited to, a notification that a user has joined a group, a notification that a user has resigned from a group, a notification that a user has received an invitation to join a group, profile information for a user, etc.

Thus, in some embodiments, the system may post information related to a group or a user to a website. By way of example, in some embodiments such social/professional network tie-ins may include, but are not limited to, wall posts when a user joins a clan, notifications when clan information or status changes, the sharing of clan member profiles, clan information broadcasted to clan members via social/professional network sites, pictures and game play videos posted, etc.

In some embodiments, such social/professional network tie-ins may also include searches for new players or competing players, such as for example proximity based searches for new players or competing players. In some embodiments, such social/professional network tie-ins may be implemented by a mini-application that enables the features to be performed on mobile devices. In some embodiments, such a mini-application may resemble the mobile application example described above.

As mentioned above, in some embodiments one or more of the methods and techniques described herein may be tied in with a microblogging service. For example, in some embodiments, information related to a team, clan, or other type of group may be transmitted to a plurality of mobile devices. By way of example, the information may be transmitted via text message, SMS, picture message, MMS, email, voice mail, video, audio, or in some other way. The type of information that may be transmitted may include any of the information mentioned above that may be posted to a website.

Similarly, in some embodiments, information related to a user may be transmitted to a plurality of mobile devices. The type of information that may be transmitted may include any of the information mentioned above that may be posted to a website.

Thus, in some embodiments, the system may cause information related to a group or a user to be transmitted to a plurality of mobile devices. By way of example, in some embodiments such feature may use the popular Twitter® service or a similar service. For example, in some embodiments Twitter® accounts may be used for potential clan recruits to follow clan activity and for clan members to receive Tweets® about new recruits. In some embodiments, a user may Tweet® when he or she wants to join a clan, a clan may notify users of clan updates via Tweets®, etc.

Embodiments of the present invention may be implemented on many different types of electronic and/or computing devices including but not limited to computers, desktop computers, laptop computers, mainframe computers, tablet or pad-like computing devices, game consoles, entertainment systems, handheld computing devices, handheld gaming devices, mobile devices, etc. In some embodiments, some such devices will employ touch sensitive panel technology. Thus, the methods and system of the present invention may be used with any devices capable of employing one or more embodiments of the systems and methods described herein.

Figure 15:
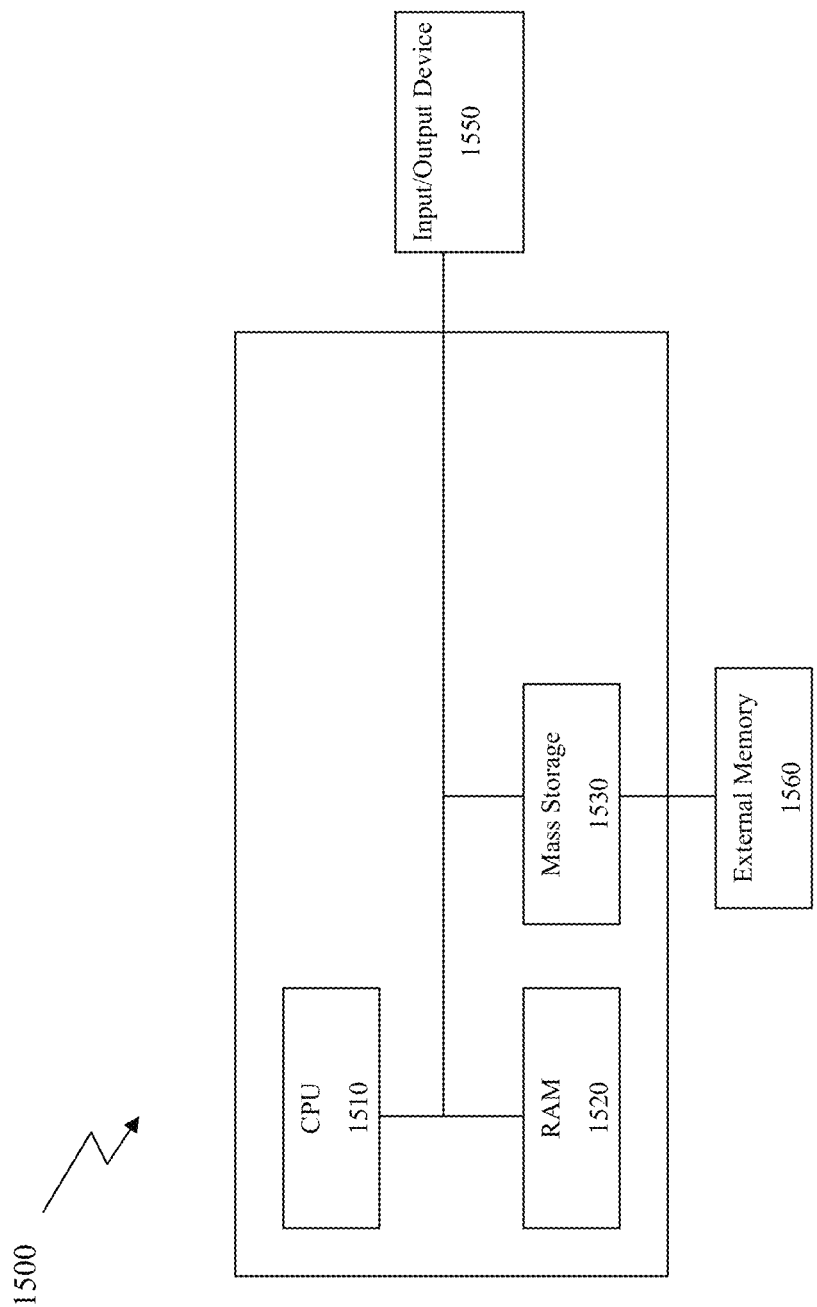
FIG. 15 illustrates a system that may be used for implementing one or more methods according to several embodiments of the present invention.

Thus, the methods and techniques described herein may be utilized, implemented and/or run on many different types of systems, including for example any of the systems and devices mentioned above. Referring to FIG. 15, there is illustrated a system 1500 that may be used for any such implementations. One or more components of the system 1500 may be used for implementing any system or device mentioned above, such as for example the computers, game console, pad-like devices, or handheld devices. However, the use of the system 1500 or any portion thereof is certainly not required. For example, in some embodiments, a computer or game console may be implemented having one or more elements of the system 1500. In some embodiments, a handheld controller may be implemented using some of the elements of the system 1500, while other elements of the system may reside in the game console associated with the handheld controller and separate from the handheld controller.

By way of example, the system 1500 may include, but is not required to include, a central processing unit (CPU) 1510, a random access memory (RAM) 1520, and a mass storage unit 1530, such as a disk drive or other type of hard drive, such as a fixed storage unit or a storage unit with removable storage media. The system 1500 may be coupled to, or integrated with, any of the other components described herein, such as an input/output device 1550. The system 1500 comprises an example of a processor based system. The CPU 1510 may be used to execute or assist in executing or perform any or all of the steps of the methods and techniques described herein. In some embodiments, the system 1500 may further comprise a GPU to execute or assist in executing the steps of the methods and techniques described herein.

In some embodiments, the input/output device 1550 may comprise a keyboard, mouse, joystick, handheld controller, motion sensitive controller, etc., and a display, such as for example an LCD, flat panel, plasma, cathode ray tube, or some other type of display. In some embodiments, the input/output device 1550 may comprise a touch sensitive panel/display. In some embodiments, the input/output device 1550 may further comprise output means, such as audio speakers, stereo, other types of displays, light emitters, etc. In some embodiments, various program content, images, reports, clouds, shadows, lighting, etc. may be rendered on the input/output device 1550.

The mass storage unit 1530 may include or comprise any type of computer readable storage or recording medium or media. The computer readable storage or recording medium or media may be fixed in the mass storage unit 1530, or the mass storage unit 1530 may optionally include a removable media or external memory 1560, such as a digital video disk (DVD), Blu-ray disc, compact disk (CD), USB storage device, floppy disk, or other media. By way of example, the mass storage unit 1530 may comprise a disk drive, a hard disk drive, flash memory device, USB storage device, Blu-ray disc drive, DVD drive, CD drive, floppy disk drive, etc. The mass storage unit 1530 or external memory 1560 may be used for storing program code, modules, or macros that implement the methods and techniques described herein.

Thus, the removable media or external memory 1560 may optionally be used with the mass storage unit 1530, which may be used for storing program code that implements the methods and techniques described herein. However, any of the storage devices, such as the RAM 1520, mass storage unit 1530 or external memory 1560, either alone or in combination may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 1520, mass storage unit 1530, or removable media or external memory 1560, may be used for storing any needed database(s), group and user parameters, characteristic data, and requirements, lists, macros, etc.

In some embodiments, a processor-based apparatus may be used for executing or performing any of the above-described steps, methods, and/or techniques. Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

For example, in some embodiments the present invention provides a computer readable storage medium storing one or more computer programs adapted to cause a processor based system to execute steps comprising: detecting a first group seeking members; detecting one or more users seeking to join a group; retrieving group parameters corresponding to the first group, wherein the group parameters comprise group characteristic data and group requirements; retrieving user parameters corresponding to each of the one or more users; for each user of the one or more users comparing the group parameters corresponding to the first group against the user parameters corresponding to the user; determining a score for each of the one or more users based on the comparing; and recommending one or more selected users of the one or more users to the first group at least in part based on the score.

In some embodiments the present invention provides a computer readable storage medium storing one or more computer programs adapted to cause a processor based system to execute steps comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups comparing the group parameters corresponding to the group against the user parameters corresponding to the first user; determining a score for each of the one or more groups based on the comparing; and recommending one or more selected groups of the one or more groups to the first user at least in part based on the score.

In some embodiments the present invention provides a computer readable storage medium storing one or more computer readable programs adapted to cause a processor based system to execute steps comprising: retrieving one or more characteristics for each of a plurality of items; and generating a first cloud corresponding to a first characteristic of the one or more characteristics, the cloud comprising: a plurality of visual identifiers each corresponding to one of the plurality of items, wherein each visual identifier comprises a first visual attribute and a second visual attribute; the first visual attribute comprising a visual indicia of a ranking of the item represented by the visual identifier compared to the other items of the plurality of items according to the first characteristic; and the second visual attribute comprising a visual indicia of a ranking of the item represented by the visual identifier compared to the other items of the plurality of items according to a score, wherein the score is derived by comparing a first set of parameters corresponding to each item of the plurality of items with a second set of parameters corresponding to a user viewing the cloud.

Examples of other embodiments the present invention are as follows. For example, another embodiment provides an apparatus comprising: a processor configured to perform the steps comprising: detecting a first group seeking members; detecting one or more users seeking to join a group; retrieving group parameters corresponding to the first group, wherein the group parameters comprise group characteristic data and group requirements; retrieving user parameters corresponding to each of the one or more users; for each user of the one or more users, comparing the group parameters corresponding to the first group against the user parameters corresponding to the user; determining a score for each of the one or more users based on the comparing; and recommending one or more selected users of the one or more users to the first group at least in part based on the score.

Another embodiment provides a method comprising: detecting a first group seeking members; detecting one or more users seeking to join a group; retrieving group parameters corresponding to the first group, wherein the group parameters comprise group characteristic data and group requirements; retrieving user parameters corresponding to each of the one or more users; for each user of the one or more users, comparing the group parameters corresponding to the first group against the user parameters corresponding to the user; determining a score for each of the one or more users based on the comparing; and recommending one or more selected users of the one or more users to the first group at least in part based on the score.

Another embodiment provides an apparatus comprising: a processor configured to perform the steps comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups, comparing the group parameters corresponding to the group against the user parameters corresponding to the first user; determining a score for each of the one or more groups based on the comparing; and recommending one or more selected groups of the one or more groups to the first user at least in part based on the score.

Another embodiment provides a method comprising: detecting a first user seeking to join a group; detecting one or more groups recruiting members; retrieving user parameters corresponding to the first user; retrieving group parameters corresponding to each of the one or more groups, wherein the group parameters comprise group characteristic data and group requirements; for each group of the one or more groups, comparing the group parameters corresponding to the group against the user parameters corresponding to the first user; determining a score for each of the one or more groups based on the comparing; and recommending one or more selected groups of the one or more groups to the first user at least in part based on the score.

Another embodiment provides an apparatus comprising: a display; and a processor based system configured to: retrieve one or more characteristics for each of a plurality of items; and generate a first cloud on the display, wherein the first cloud corresponds to a first characteristic of the one or more characteristics, the cloud comprising: a plurality of visual identifiers each corresponding to one of the plurality of items, wherein each visual identifier comprises a first visual attribute and a second visual attribute; the first visual attribute comprising a visual indicia of a ranking of the item represented by the visual identifier compared to the other items of the plurality of items according to the first characteristic; and the second visual attribute comprising a visual indicia of a ranking of the item represented by the visual identifier compared to the other items of the plurality of items according to a score, wherein the score is derived by comparing a first set of parameters corresponding to each item of the plurality of items with a second set of parameters corresponding to a user viewing the cloud.

Another embodiment provides a method comprising: retrieving one or more characteristics for each of a plurality of items; and generating a first cloud on a display, wherein the first cloud corresponds to a first characteristic of the one or more characteristics, the cloud comprising: a plurality of visual identifiers each corresponding to one of the plurality of items, wherein each visual identifier comprises a first visual attribute and a second visual attribute; the first visual attribute comprising a visual indicia of a ranking of the item represented by the visual identifier compared to the other items of the plurality of items according to the first characteristic; and the second visual attribute comprising a visual indicia of a ranking of the item represented by the visual identifier compared to the other items of the plurality of items according to a score, wherein the score is derived by comparing a first set of parameters corresponding to each item of the plurality of items with a second set of parameters corresponding to a user viewing the cloud.

In some embodiments, many of the functional units described in this specification may be implemented by way of modules. For example, a module may be implemented as a software program, a hardware circuit comprising custom VLSI circuits or gate arrays, off-the-shelf semiconductors such as logic chips, transistors, or other discrete components. A module may also be implemented in programmable software routines and/or programmable hardware devices such as field programmable gate arrays, programmable array logic, programmable logic devices or the like.

Modules implemented in software may be for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the above description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A non-transitory computer readable storage medium storing one or more computer readable programs adapted to cause a processor based system to execute steps comprising:
   detecting a first user seeking to join a group that competes as a team in a plurality of matches against different groups;
   detecting one or more groups recruiting members, each group comprises a plurality of members that competes as a team in a plurality of matches against other groups;
   retrieving user parameters corresponding to the first user;

retrieving group parameters from group profiles corresponding to each of the one or more groups, wherein the group parameters comprise group characteristic data and group requirements separate from user parameters of individual members of the group, the group characteristic data being descriptive items representing overall characteristics of the group comprising a plurality of members;

for each group of the one or more groups, comparing the group parameters corresponding to the group against the user parameters corresponding to the first user;

determining a score for each of the one or more groups based on the comparing;

recommending one or more selected groups of the one or more groups to the first user at least in part based on the score;

providing a display of the one or more selected groups to the first user according to the score associated with each of the one or more selected groups such that scores for each of the one or more selected groups is indicated relative to others of the one or more selected groups; and automatically updating the display of the one or more selected groups based on group game play statistics determined based on game play that occur after the one or more selected groups are recommended to the first user.

2. The computer readable storage medium of claim 1, wherein the user parameters comprise one or more parameters determined by the system.

3. The computer readable storage medium of claim 1, wherein the user parameters comprise one or more parameters entered by the user.

4. The computer readable storage medium of claim 1, wherein the one or more computer readable programs are further adapted to cause the processor based system to execute steps comprising:

sending a request to join to the at least one of the one or more selected groups.

5. The computer readable storage medium of claim 4, wherein the one or more computer readable programs are further adapted to cause the processor based system to execute steps comprising:

detecting that the at least one of the one or more selected groups has accepted the request to join; and adding the first user to the at least one of the one or more selected groups.

6. The computer readable storage medium of claim 1, wherein the one or more computer readable programs are further adapted to cause the processor based system to execute steps comprising:

posting information related to the first user or at least one of the one or more selected groups to a website.

7. The computer readable storage medium of claim 1, wherein the one or more computer readable programs are further adapted to cause the processor based system to execute steps comprising:

causing information related to the first user or at least one of the one or more selected groups to be transmitted to a plurality of mobile devices.

8. The computer readable storage medium of claim 1, wherein the group requirements are entered by one or more existing member of each of the one or more groups, separate from the user parameters of the members of the group.

9. The computer readable storage medium of claim 1, wherein in an event that the first user indicates an interest in a group of the one or more selected groups, increasing a user score of the first user in a recommended user report for the group of the one or more selected groups.

10. An apparatus comprising:

a processor configured to perform the steps comprising:

detecting a first user seeking to join a group that competes as a team in a plurality of matches against different groups;

detecting one or more groups recruiting members, each group comprises a plurality of members that competes as a team in a plurality of matches against other groups;

retrieving user parameters corresponding to the first user;

retrieving group parameters from group profiles corresponding to each of the one or more groups, wherein the group parameters comprise group characteristic data and group requirements separate from user parameters of individual members of the group, the group characteristic data being descriptive items representing overall characteristics of the group comprising a plurality of members;

for each group of the one or more groups, comparing the group parameters corresponding to the group against the user parameters corresponding to the first user;

determining a score for each of the one or more groups based on the comparing;

recommending one or more selected groups of the one or more groups to the first user at least in part based on the score;

providing a display of the one or more selected groups to the first user according to the score associated with each of the one or more selected groups such that scores for each of the one or more selected groups is indicated relative to others of the one or more selected groups; and automatically updating the display of the one or more selected groups based on group game play statistics determined based on game play that occur after the one or more selected groups are recommended to the first user.

11. The apparatus of claim 10, further comprising a display for displaying the one or more selected groups to the first user.

12. The apparatus of claim 10, wherein the displaying the one or more selected groups comprises displaying the one or more selected groups in a report.

13. The apparatus of claim 10, wherein the displaying the one or more selected groups comprises displaying the one or more selected groups in one or more word clouds comprising group names, wherein the scores for each of the one or more selected groups relative to others of the one or more selected groups is indicated by at least one of font size and color of the group names.

14. A method comprising:

detecting a first user seeking to join a group that competes as a team in a plurality of matches against different groups;

detecting one or more groups recruiting members, each group comprises a plurality of members that competes as a team in a plurality of matches against other groups;

retrieving user parameters corresponding to the first user;

retrieving group parameters from group profiles corresponding to each of the one or more groups, wherein the group parameters comprise group characteristic data and group requirements separate from user parameters of individual members of the group, the group characteristic data being descriptive items representing overall characteristics of the group comprising a plurality of members;

for each group of the one or more groups, comparing the group parameters corresponding to the group against the user parameters corresponding to the first user;

determining a score for each of the one or more groups based on the comparing;

recommending one or more selected groups of the one or more groups to the first user at least in part based on the score;

providing a display of the one or more selected groups to the first user according to the score associated with each of the one or more selected groups such that scores for each of the one or more selected groups is indicated relative to others of the one or more selected groups; and automatically updating the display of the one or more selected groups based on group game play statistics determined based on game play that occur after the one or more selected groups are recommended to the first user.

15. A non-transitory computer readable storage medium storing one or more computer readable programs adapted to cause a processor based system to execute steps comprising:

detecting a first user seeking to join a group that competes as a team in a plurality of matches against different groups;

detecting one or more groups recruiting members, each group comprises a plurality of members that competes as a team in a plurality of matches against other groups;

retrieving group parameters from group profiles corresponding to each of the one or more groups, wherein the group parameters comprise group characteristic data and group requirements separate from user parameters of individual members of the group, the group characteristic data being descriptive items representing overall characteristics of the group comprising a plurality of members;

determining a score for each of the one or more groups based on comparing group parameters corresponding to the group against user parameters corresponding to the first user;

recommending one or more selected groups of the one or more groups to the first user at least in part based on the score;

providing a display of the one or more selected groups to the first user according to the score associated with each of the one or more selected groups such that scores for each of the one or more selected groups is indicated relative to others of the one or more selected groups; and automatically updating the display of the one or more selected groups based on group game play statistics determined based on game play that occur after the one or more selected groups are recommended to the first user.

* * * * *